(12) United States Patent
Takahata

(10) Patent No.: US 11,915,664 B2
(45) Date of Patent: Feb. 27, 2024

(54) DISPLAY DEVICE

(71) Applicant: Japan Display Inc., Tokyo (JP)

(72) Inventor: Masashi Takahata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/986,019

(22) Filed: Nov. 14, 2022

(65) Prior Publication Data

US 2023/0071294 A1 Mar. 9, 2023

Related U.S. Application Data

(63) Continuation of application No. PCT/JP2021/015243, filed on Apr. 13, 2021.

(30) Foreign Application Priority Data

May 15, 2020 (JP) ................. 2020-086151

(51) Int. Cl.
*G09G 3/36* (2006.01)
*G02B 27/01* (2006.01)

(52) U.S. Cl.
CPC ....... *G09G 3/3677* (2013.01); *G02B 27/0101* (2013.01); *G09G 2310/061* (2013.01); *G09G 2320/041* (2013.01)

(58) Field of Classification Search
CPC .......... G01K 7/16; G01K 7/183; G01K 1/026; G09G 3/3233; G09G 3/3648;
(Continued)

(56) References Cited

U.S. PATENT DOCUMENTS 9,753,283 B2 9/2017 Nambara
2010/0182261 A1 7/2010 Nose
(Continued)

FOREIGN PATENT DOCUMENTS

JP 2006-235308 A 9/2006
JP 2008-191611 A 8/2008
(Continued)

OTHER PUBLICATIONS

International Search Report issued in International Patent Application No. PCT/JP2021/015243 dated Jul. 13, 2021 and English translation of same. 7 pages.
(Continued)

*Primary Examiner* — Xuemei Zheng
(74) *Attorney, Agent, or Firm* — K&L Gates LLP

(57) ABSTRACT

According to an aspect, a display device, includes: a display panel having a display region in which a plurality of pixels are provided; a plurality of temperature sensors; and a control integrated circuit (IC) configured to control operations of the display panel and the temperature sensors. A plurality of temperature detection regions in which the temperature sensors are arranged are provided to overlap the display region. The display region has a plurality of partial regions that overlap the temperature detection regions, respectively. The control IC is provided capable of controlling the display region on a partial region basis. At least either signal lines of the display panel or scan lines of the display panel, and the temperature sensors are coupled to the control IC.

10 Claims, 22 Drawing Sheets

(58) Field of Classification Search
CPC .............. G09G 3/3677; G09G 3/3688; G09G 2310/08; G09G 2320/041; G09G 2320/0233; G09G 2320/0626; G09G 2330/021; G09G 2330/045; G09G 2330/12; G09G 3/3291; G09G 2300/0819; G09G 2320/029; G09G 2310/06
See application file for complete search history.

(56) References Cited

U.S. PATENT DOCUMENTS

| | | | | |
|---|---|---|---|---|
| 2013/0321361 | A1* | 12/2013 | Lynch | H10K 59/00 345/204 |
| 2016/0103358 | A1* | 4/2016 | Tanaka | G06F 3/0412 349/12 |
| 2016/0225339 | A1* | 8/2016 | Kim | G09G 3/20 |
| 2019/0378454 | A1* | 12/2019 | Jin | G09G 3/3225 |
| 2021/0125554 | A1* | 4/2021 | Lee | G06F 1/206 |
| 2021/0248980 | A1* | 8/2021 | Lee | G09G 5/006 |

FOREIGN PATENT DOCUMENTS

| | | |
|---|---|---|
| JP | 2010-165269 A | 7/2010 |
| JP | 2011-160282 A | 8/2011 |
| JP | 2013-054520 A | 3/2013 |
| JP | 2015-210328 A | 11/2015 |
| JP | 2016-139077 A | 8/2016 |

OTHER PUBLICATIONS

Written Opinion issued in International Patent Application No. PCT/JP2021/015243 dated Jul. 13, 2021. 5 pages.

Japanese Office Action issued in related Japanese Patent Application No. 2020-086151, dated Oct. 3, 2023, and English translation of same. 9 pages.

* cited by examiner

| DETECTION TARGET | DETECTION TIMING | DETECTION FREQUENCY |
|---|---|---|
| SINGLE AREA | BLANKING AND WRITE | 1 Hz TO 120 Hz |
| MULTIPLE AREAS | BLANKING | 1 Hz TO 60 Hz |
| ALL AREAS | BLANKING | 1 Hz TO 10 Hz |

DISPLAY DEVICE

CROSS-REFERENCE TO RELATED APPLICATION

This application claims the benefit of priority from Japanese Patent Application No. 2020-086151 filed on May 15, 2020 and International Patent Application No. PCT/JP2021/015243 filed on Apr. 13, 2021, the entire contents of which are incorporated herein by reference.

BACKGROUND

1. Technical Field

What is disclosed herein relates to a display device.

2. Description of the Related Art

What is called head-up displays (HUDs) that project an image onto a member having a light-transmitting property, such as glass, have been known (for example, Japanese Patent Application Laid-open Publication No. 2015-210328 (JP-A-2015-210328)).

With the technique in JP-A-2015-210328, sunlight may be incident on a display device through an optical system. When sunlight focused by the optical system hits the display device, the place of the display device where the focused light hits may become hot and adversely affect the display device. A mechanism, thus, has been required that can cope with a temperature rise.

When a temperature detection function is simply added to the display device, a circuit for a display output function and another circuit for the temperature detection function are provided separately. As a result, wiring lines are coupled to each circuit. Furthermore, a signal transmission path between the circuit for the display output function and the circuit for the temperature detection function is required to perform display control to cope with a temperature rise. Even when the display control to cope with a temperature rise relies on an external control device and the display control function is omitted from the display device, feedback from each circuit needs to be provided to the control device. When the control function is provided in the display device, a circuit for the control function is additionally required. In both cases, such a display device becomes complicated due to increase in the numbers of circuits and wiring lines and has high costs of wiring boards.

For the foregoing reasons, there is a need for a display device that can cope with a temperature rise and reduce an increase in the number of wiring lines.

SUMMARY

According to an aspect, a display device, includes: a display panel having a display region in which a plurality of pixels are provided; a plurality of temperature sensors; and a control integrated circuit (IC) configured to control operations of the display panel and the temperature sensors. A plurality of temperature detection regions in which the temperature sensors are arranged are provided to overlap the display region. The display region has a plurality of partial regions that overlap the temperature detection regions, respectively. The control IC is provided capable of controlling the display region on a partial region basis. At least either signal lines of the display panel or scan lines of the display panel, and the temperature sensors are coupled to the control IC.

DETAILED DESCRIPTION

Figure 1:
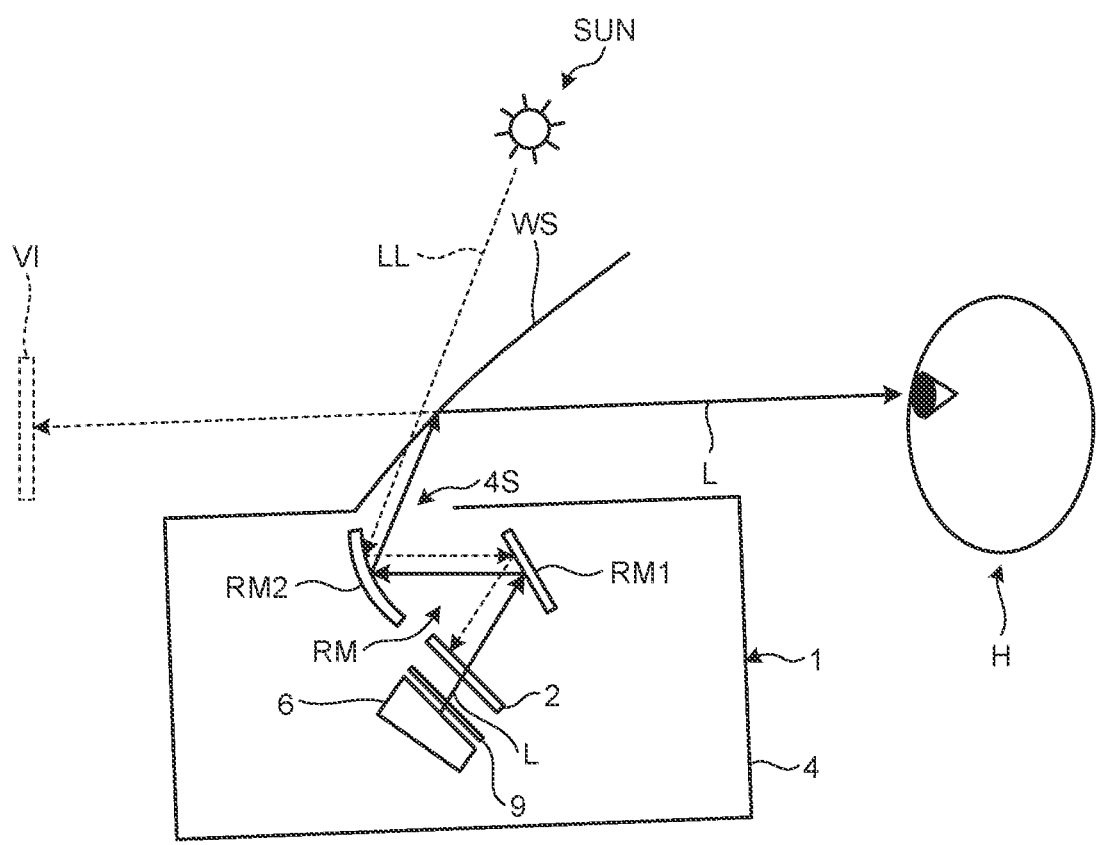
FIG. 1 is an explanatory diagram schematically illustrating a head-up display (HUD) device.

A mode for carrying out the present disclosure (embodiment) will be described in detail with reference to the drawings. Contents described in the following embodiment do not limit the present disclosure. Components described below include those that can be easily assumed by those skilled in the art and substantially the same components. Furthermore, the components described below can be appropriately combined. What is disclosed herein is merely an example, and it is needless to say that appropriate modifications within the gist of the disclosure at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred to, and detail explanation thereof can be appropriately omitted.

In this disclosure, when an element is described as being "on" another element, the element can be directly on the other element, or there can be one or more elements between the element and the other element.

FIG. 1 is an explanatory diagram schematically illustrating a head up display (HUD) device 1. The HUD device 1 includes a light source device 6, a diffusion plate 9, a display panel 2, and an optical system RM that magnifies an image from the display panel 2 and projects it onto a projection plate WS.

A housing 4 accommodates therein the light source device 6, the display panel 2 that outputs the image using light L from the light source device 6, the diffusion plate 9 provided between the display panel 2 and the light source device 6, and the optical system RM.

The light L emitted from the light source device 6 is diffused by the diffusion plate 9, partially or fully passes through the display panel 2, and becomes the light of the image. In the HUD device 1 in the embodiment, the optical system RM including a mirror member RM1 and a mirror member RM2 guides the light L passing through the display panel 2 to the projection plate WS. The mirror member RM1 is a plane mirror, and the mirror member RM2 is a concave mirror. The mirror member RM1 may be a concave mirror. The mirror member RM2 may be a plane mirror. The optical system RM is not limited thereto, and the optical system RM may include one mirror member or three or more mirror members.

The light of the image passing through the optical system RM is reflected by the projection plate WS and reaches a user H. As a result, the light of the image is recognized as an image VI in the user H's field of vision. In other words, the HUD device 1 in the embodiment functions as a display system that projects images onto the projection plate WS. It is sufficient that the projection plate WS is a member having a light-transmitting property and located on the line of the user H's sight. The projection plate WS, which is a plate member having a light-transmitting property, is a windscreen or a windshield of a vehicle, or what is called a combiner provided separately from the windscreen, for example.

Figure 2:
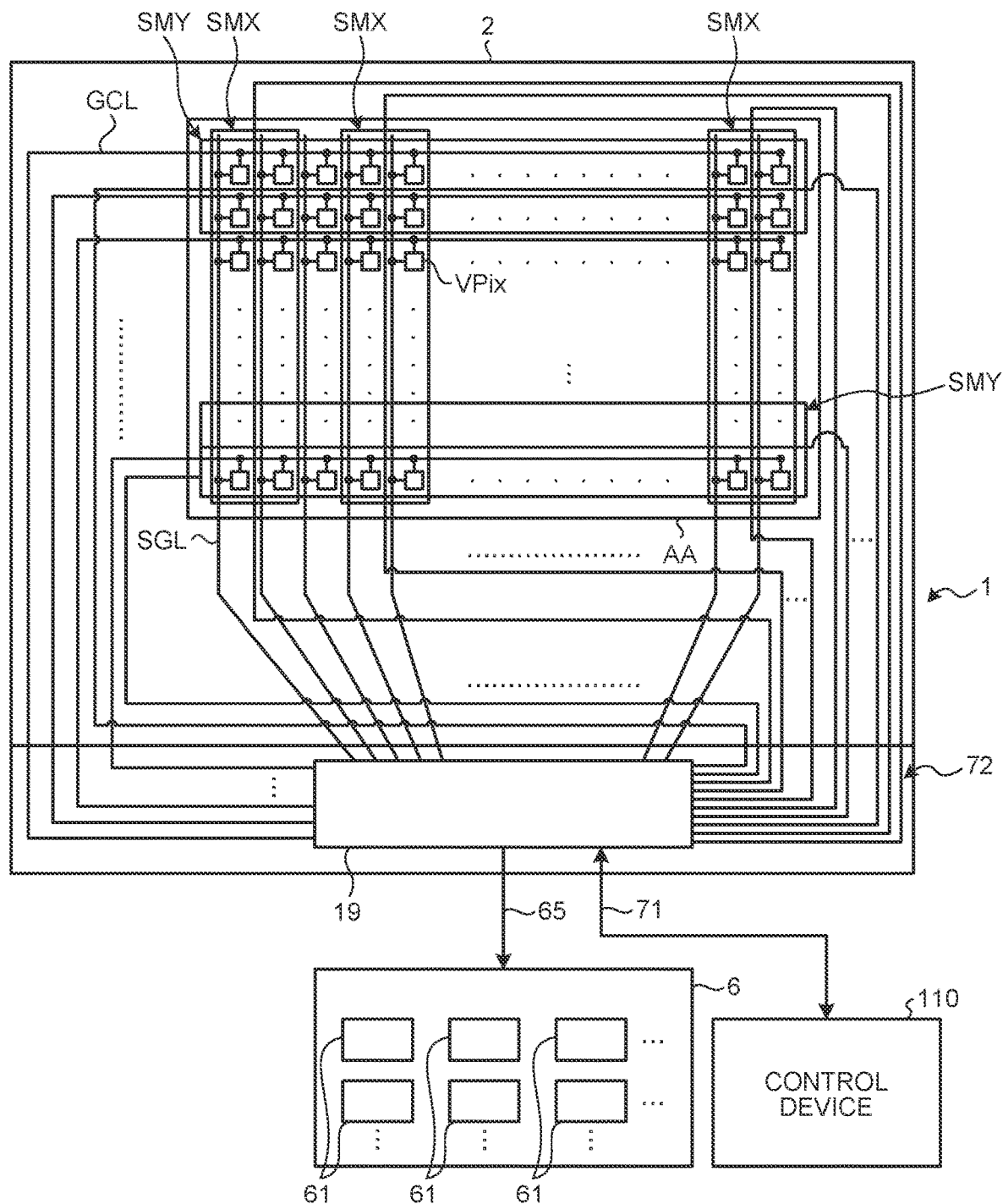
FIG. 2 is an explanatory diagram schematically illustrating a main configuration of the HUD device in an embodiment.
Figure 3:
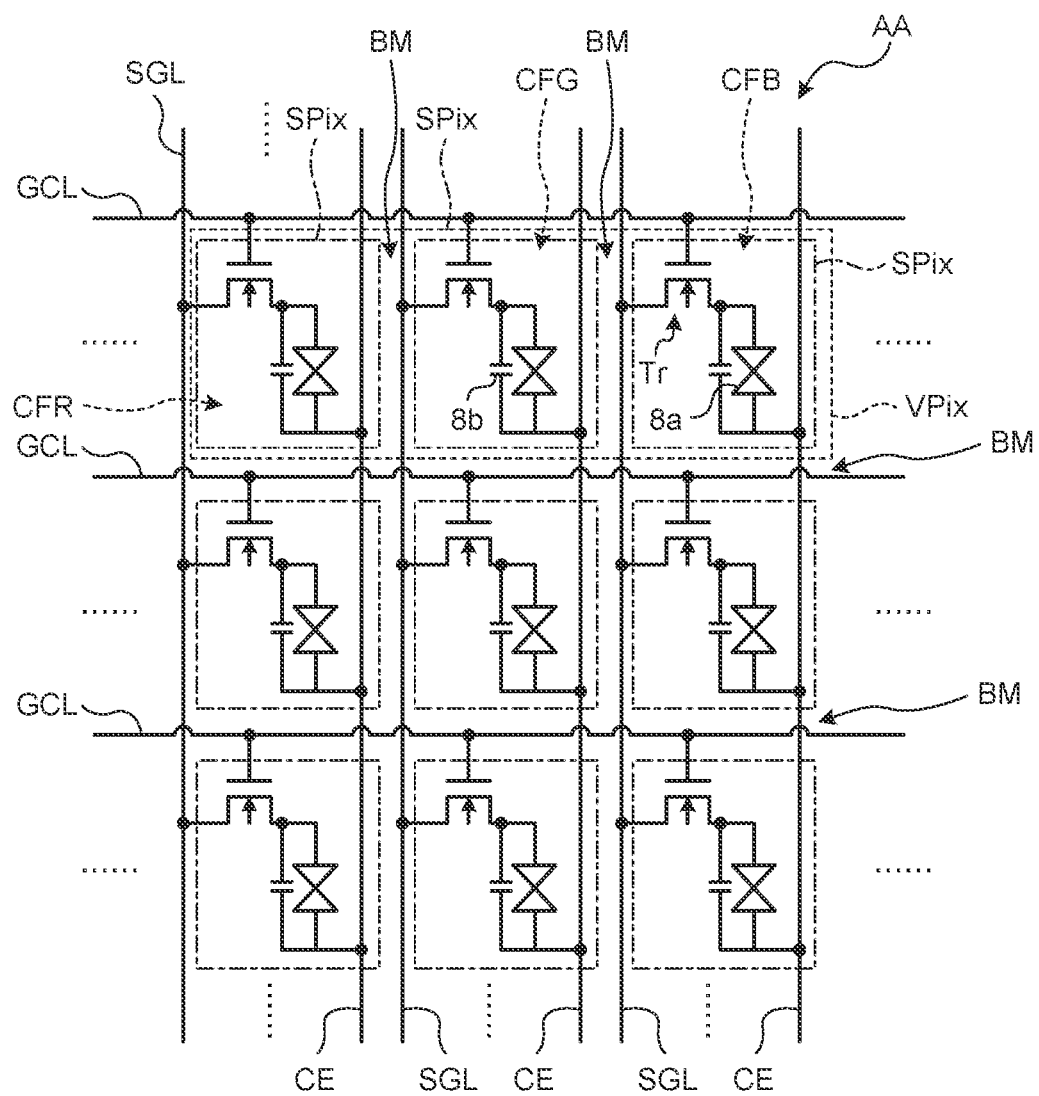
FIG. 3 is an explanatory diagram illustrating pixels of a display panel.
Figure 4:
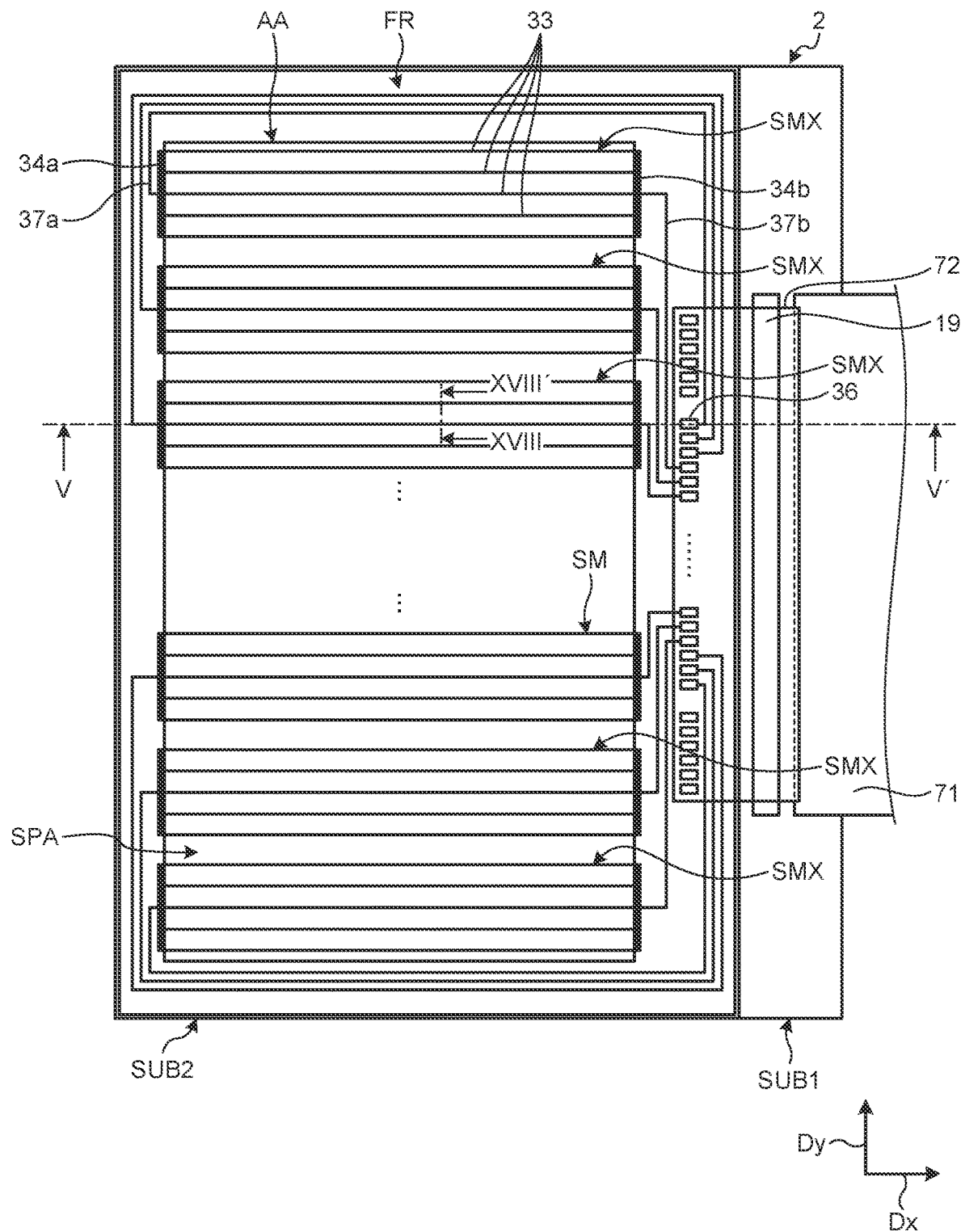
FIG. 4 is a plan view illustrating an arrangement of first temperature detection wirings in the embodiment.
Figure 5:
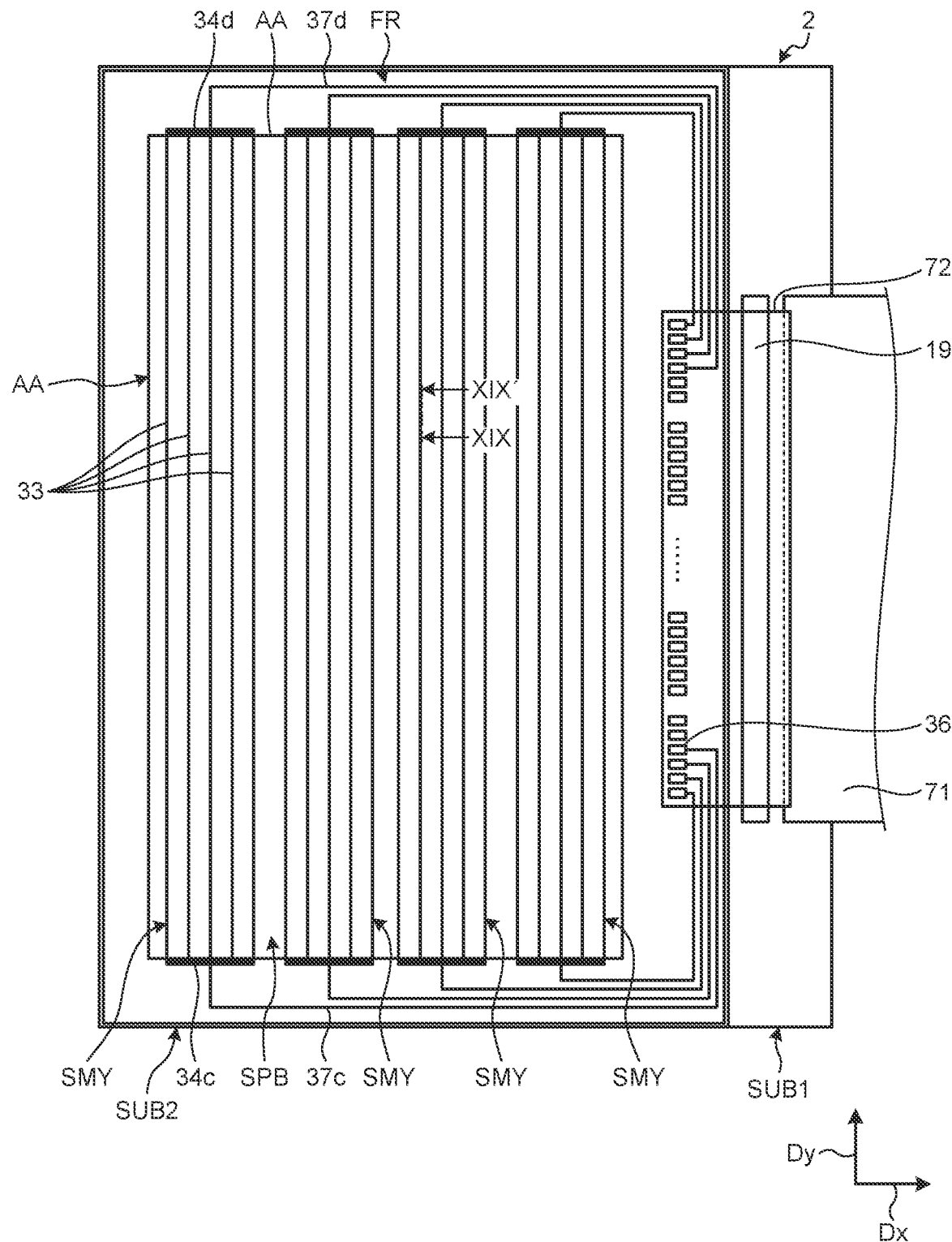
FIG. 5 is a plan view illustrating an arrangement of second temperature detection wirings in the embodiment.
Figure 6:
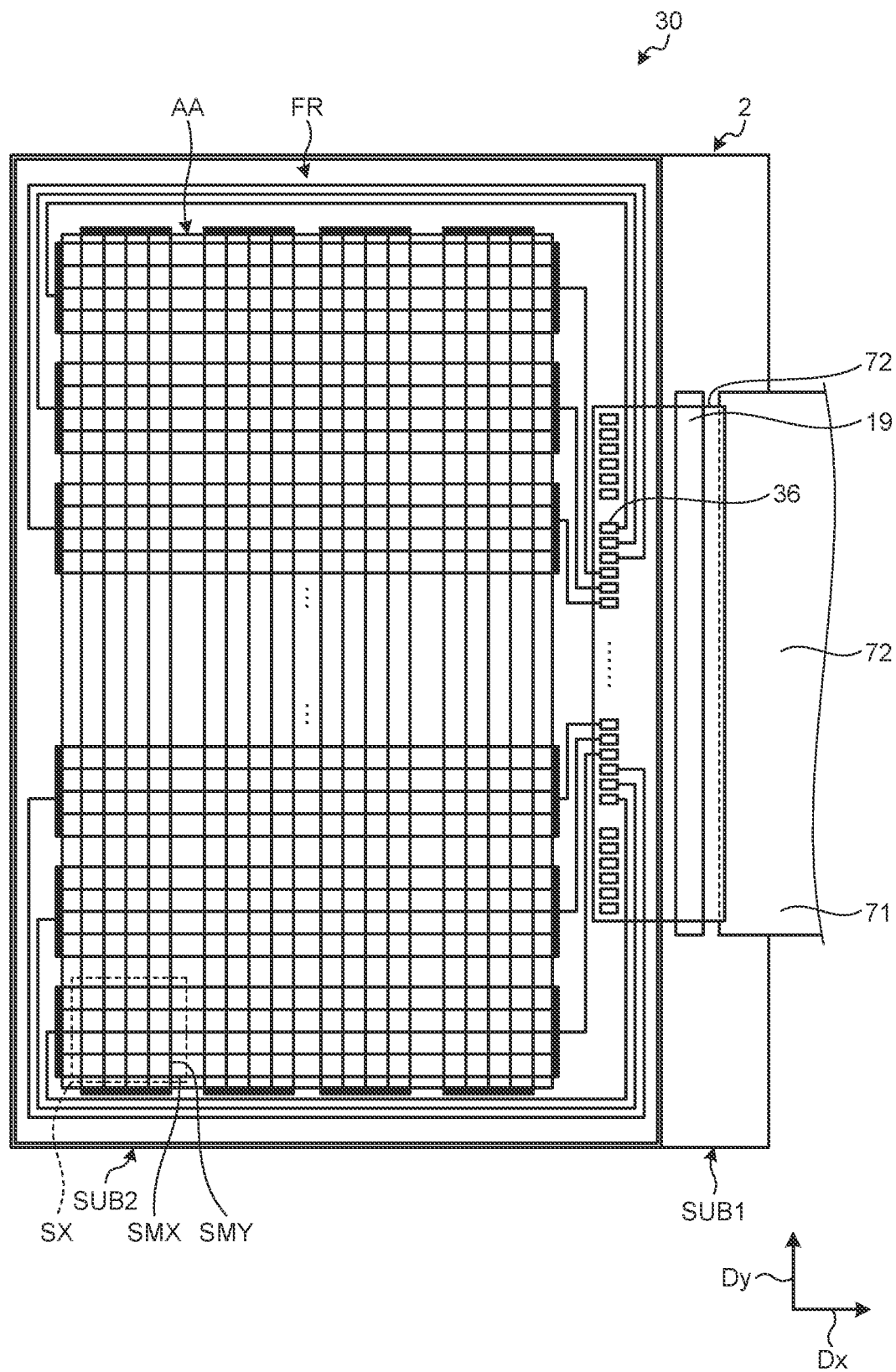
FIG. 6 is a plan view illustrating a superimposed position of the first and the second temperature detection wirings.
Figure 7:
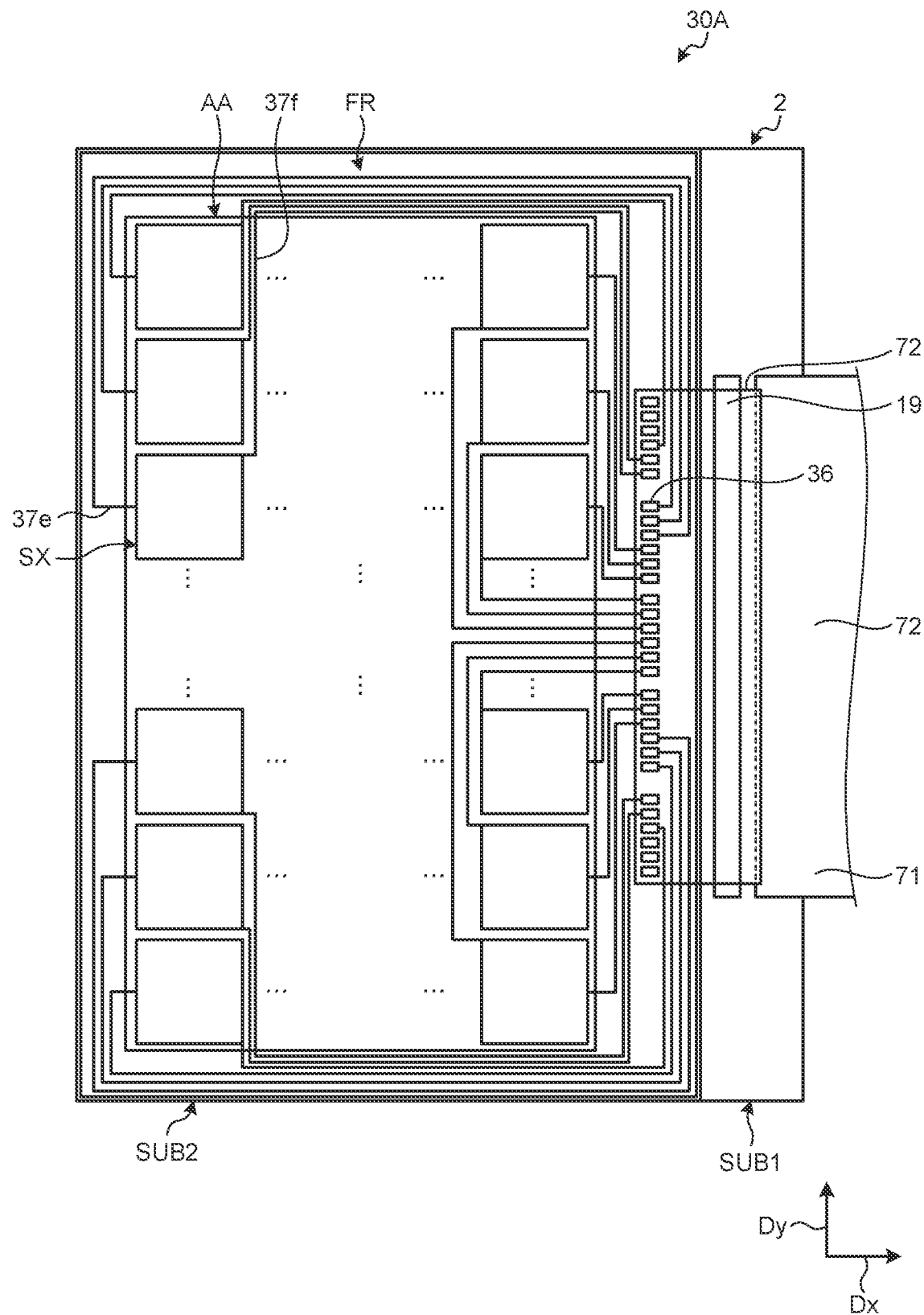
FIG. 7 is a plan view illustrating an arrangement of temperature detection electrodes.
Figure 8:
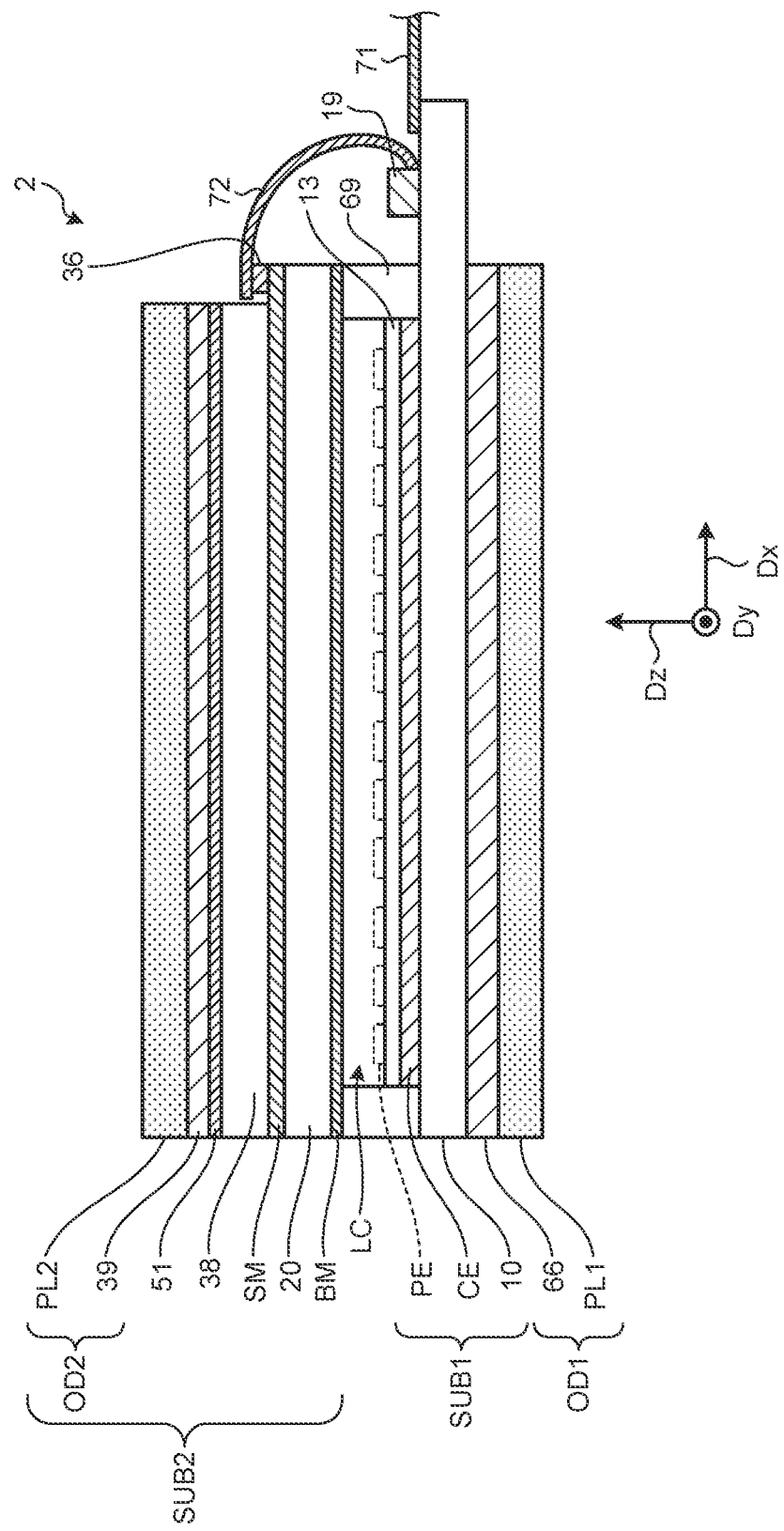
FIG. 8 is a cross-sectional view illustrating a schematic V-V' cross-section of the display panel illustrated in FIG. 4.
Figure 9:
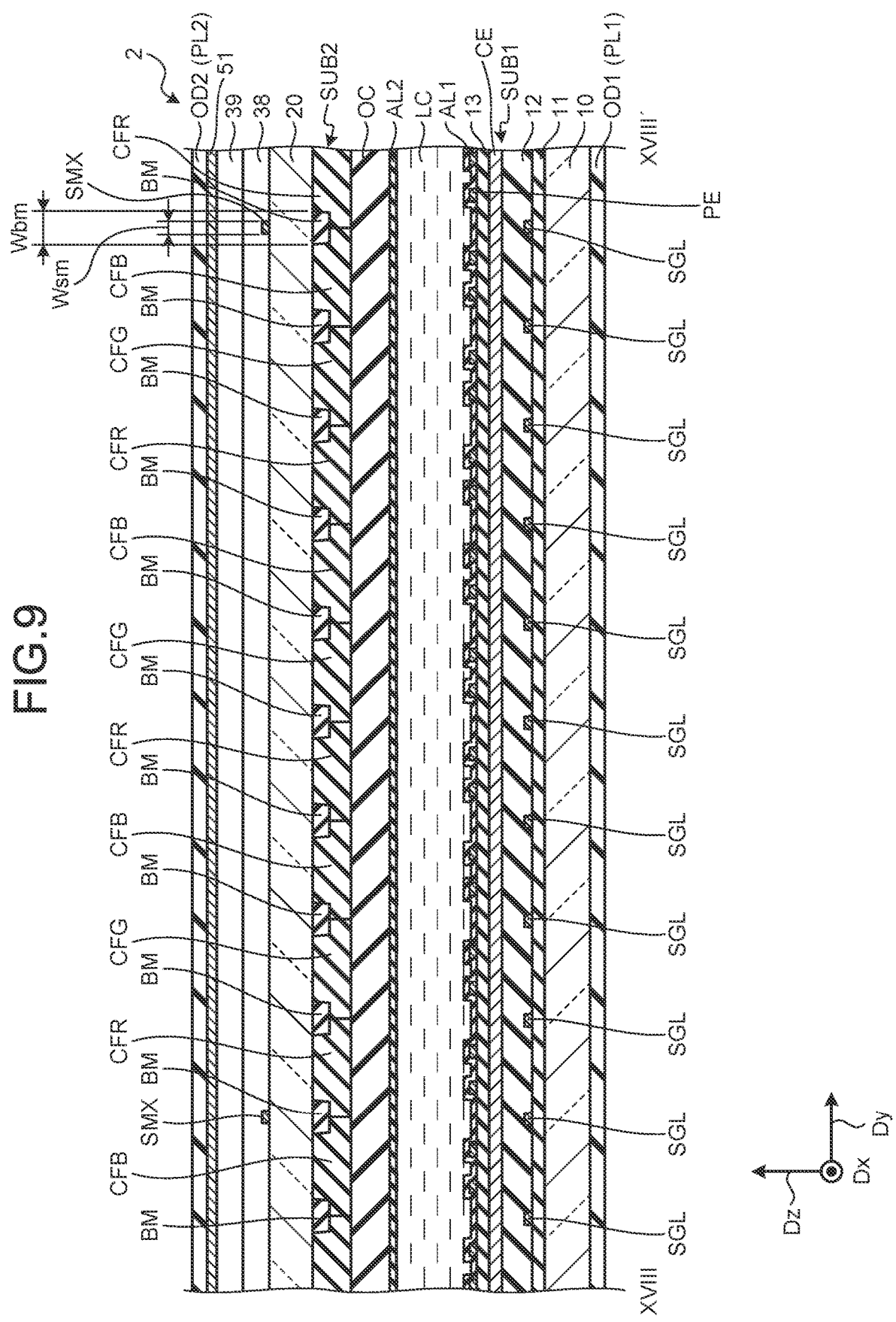
FIG. 9 is a cross-sectional view illustrating a schematic XVIII-XVIII' cross-section of the display panel illustrated in FIG. 4.
Figure 10:
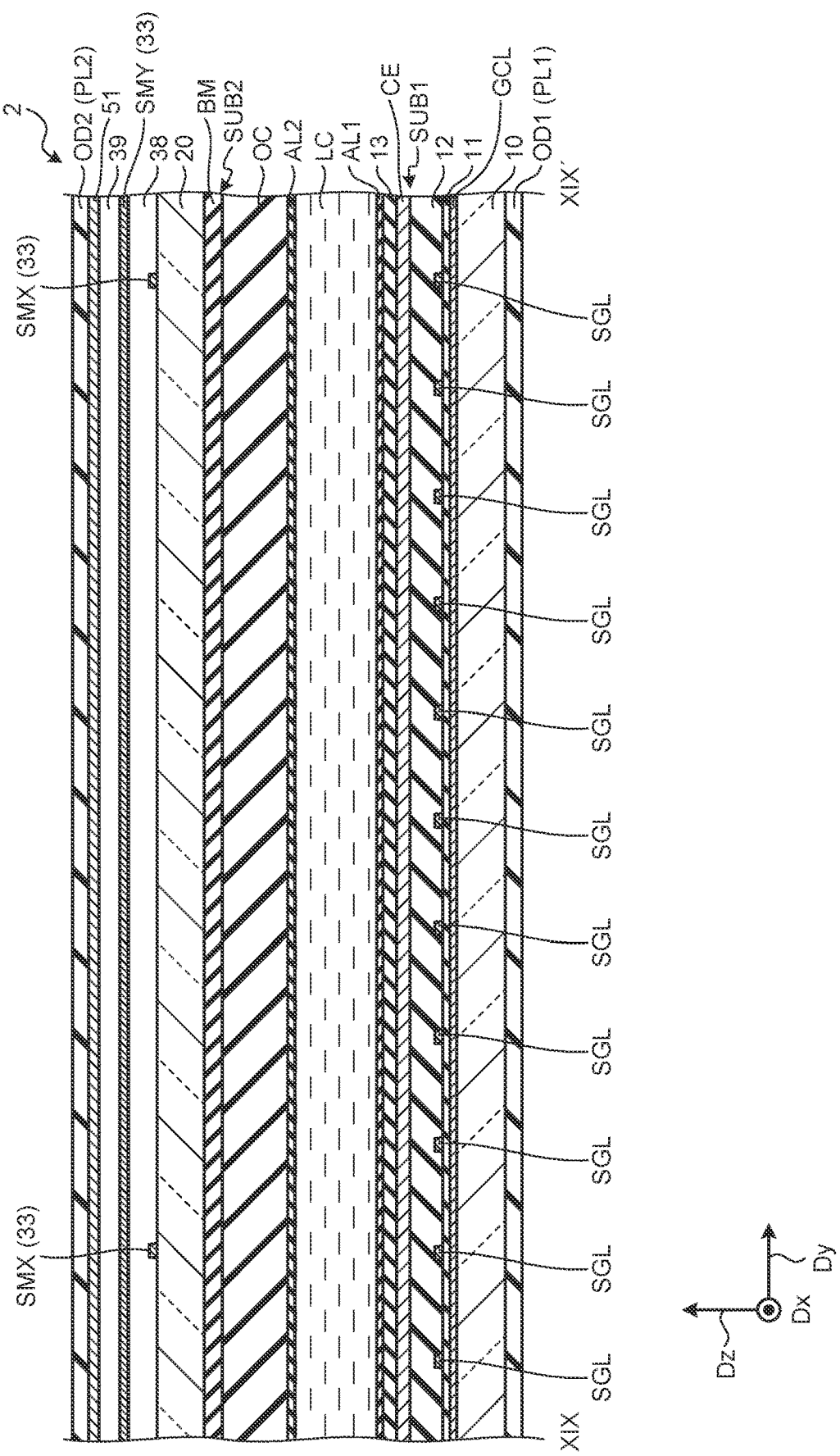
FIG. 10 is a cross-sectional view illustrating a schematic XIX-XIX' cross-section of the display panel illustrated in FIG. 5.

FIG. 2 is an explanatory diagram schematically illustrating a main configuration of the HUD device 1 in the embodiment. FIG. 3 is an explanatory diagram illustrating pixels of the display panel 2. FIG. 4 is a plan view illustrating an arrangement of first temperature detection wirings in the embodiment. FIG. 5 is a plan view illustrating an arrangement of second temperature detection wirings in the embodiment. FIG. 6 is a plan view illustrating a superposed position of the first and the second temperature detection wirings. FIG. 7 is a plan view illustrating an arrangement of temperature detection electrodes. FIG. 8 is a cross-sectional view illustrating a schematic V-V' cross-section of the display panel 2 illustrated in FIG. 4. FIG. 9 is a cross-sectional view illustrating a schematic XVIII-XVIII' cross-section of the display panel 2 illustrated in FIG. 4. FIG. 10 is a cross-sectional view illustrating a schematic XIX-XIX' cross-section of the display panel 2 illustrated in FIG. 5.

The display panel 2 in the embodiment is a transmissive liquid crystal display that outputs an image using the light L. As illustrated in FIG. 2, a large number of pixels VPix are arranged in a matrix with a row-column configuration in a display region AA of the display panel 2. Hereinafter, the expression "in a matrix" means a matrix shape corresponding to a matrix having rows in a first direction Dx and columns in a second direction Dy.

Each of the pixels VPix illustrated in FIG. 3 has a plurality of sub pixels SPix. Each of the sub pixels SPix has a switching element Tr and a liquid crystal capacitor 8a. The switching element Tr is formed with a thin-film transistor. The switching element Tr is formed with an re-channel metal oxide semiconductor (MOS)-type TFT in this example. An insulating layer 24 is provided between pixel electrodes PE and common electrodes CE, whereby holding capacitors 8b is formed as illustrated in FIG. 3.

The switching elements Tr of the respective sub pixels SPix illustrated in FIG. 3, signal lines SGL, scan lines GCL, and the like are formed on a first substrate 10 (see FIG. 8). The signal lines SGL are wiring lines for supplying pixel signals to the pixel electrodes PE illustrated in FIG. 8. The scan lines GCL are wiring lines for supplying drive signals for driving the switching elements Tr. The signal lines SGL and the scan lines GCL are provided along a plane parallel to the surface of the first substrate 10 illustrated in FIG. 8.

As illustrated in FIG. 3, light shielding layers BM are formed along the signal lines SGL and the scan lines GCL. Although FIG. 3 illustrates electrical coupling of the switching elements Tr, the light shielding layers BM overlap also the switching elements Tr actually. The sub pixels SPix have apertures surrounded by the light shielding layers BM, and a set of color filters CFR, CFG, and CFB that are respectively colored in three colors of red (R), green (G), and blue (B) corresponds to the apertures of the sub pixels SPix illustrated in FIG. 3. A set of the sub pixels SPix corresponding to the color filters CFR, CFG, and CFB in three colors configures each pixel VPix. The color filters may include color regions in four or more colors.

As illustrated in FIG. 2, a plurality of first temperature detection wirings SMX and a plurality of second temperature detection wirings SMY are aligned. Both terminals of the first temperature detection wiring SMX and the second temperature detection wirings SMY are led out and electrically coupled to a temperature detection controller 120 of a display driver integrated circuit (DDIC) 19. The DDIC 19 is a circuit packaged as what is called a single-chip integrated circuit (IC).

The following describes an exemplary configuration of the display panel 2 in detail. As illustrated in FIG. 8, the display panel 2 includes an array substrate SUB1, a counter substrate SUB2, and a liquid crystal layer LC serving as a display function layer. The counter substrate SUB2 is disposed so as to face the array substrate SUB1 in the direction perpendicular to the surface of the array substrate SUB1. The liquid crystal layer LC is provided between the array substrate SUB1 and the counter substrate SUB2.

In the embodiment, in the direction perpendicular to the surface of the first substrate 10, the side in the direction from the first substrate 10 toward a second substrate 20 of the counter substrate SUB2 is referred to as an "upper side". The side in the direction from the second substrate 20 toward the first substrate 10 is referred to as a "lower side".

The array substrate SUB1 includes the first substrate 10, the pixel electrodes PE, the common electrodes CE, and a polarization plate PL1. The switching elements Tr such as thin film transistors (TFTs) and various types of wiring lines (not illustrated in FIG. 8) such as the scan lines GCL and the signal lines SGL are provided on the first substrate 10.

The common electrodes CE are provided on the upper side of the first substrate 10. The pixel electrodes PE are provided on the upper side of the common electrodes CE with the insulating layer 24 interposed therebetween. The pixel electrodes PE are provided in a layer different from that of the common electrodes CE, and are arranged so as to overlap the common electrodes CE in plan view. The pixel electrodes PE are arranged in a matrix with a row-column configuration in plan view. The polarization plate PL1 is provided on the lower side of the first substrate 10 with an adhesive layer 66 interposed therebetween. The pixel electrodes PE and the common electrodes CE are made of a conductive material having a light-transmitting property, such as indium tin oxide (ITO). The embodiment describes the example in which the pixel electrodes PE are provided on the upper side of the common electrodes CE. The common electrodes CE may be provided on the upper side of the pixel electrodes PE.

The DDIC 19 and a flexible substrate 71 are provided on the first substrate 10. The flexible substrate 71 is coupled to a control device 110 (refer to FIG. 11).

The counter substrate SUB2 includes the second substrate 20, the light shielding layers BM formed on one surface of the second substrate 20, a shield conductive layer 51 provided on the other surface of the second substrate 20, the first temperature detection wirings SMX, the second temperature detection wirings SMY, a protective layer 38, a protective layer 39, and a polarization plate PL2. As illustrated in FIGS. 9 and 10, the color filters CFR, CFG, and CFB are also formed on the one surface of the second substrate 20, like the light shielding layers BM.

As illustrated in FIGS. 9 and 10, the first temperature detection wirings SMX and the second temperature detection wirings SMY are aligned on the second substrate 20. As illustrated in FIG. 8, a flexible substrate 72 is coupled to the second substrate 20. The first temperature detection wirings SMX and the second temperature wirings SMY are electrically coupled to the flexible substrate 72 with terminal portions 36 interposed therebetween. The detailed configuration of the first temperature detection wirings SMX and the second temperature lines SMY are described later.

The protective layer 38 is an insulating layer for protecting the first temperature detection wirings SMX. The protective layer 39 is an insulating layer for protecting the second temperature detection wirings SMY. The protective layers 38 and 39 can be made of a light-transmitting resin such as acrylic resin. The shield conductive layer 51 is formed on the protective layer 39. In other words, the first temperature detection wirings SMX, the second temperature detection wirings SMY, and the shield conductive layer 51 are on the upper side of the second substrate 20, and the first temperature detection wirings SMX and the second temperature detection wirings SMY are stacked on the lower side of the shield conductive layer 51. The protective layer 39 electrically insulates the shield conductive layer 51 from the second temperature detection wirings SMY. The protective layer 38 electrically insulates the second temperature detection wirings SMX from the first temperature detection wirings SMY.

The shield conductive layer 51 is a light-transmitting conductive layer and is formed of, for example, ITO, indium zinc oxide (IZO), SnO, or an organic conductive film. The shield conductive layer 51 may be an oxide layer containing tin oxide ($SnO_2$) and silicon dioxide ($SiO_2$) as main components, an oxide layer containing gallium oxide ($Ga_2O_3$), indium oxide ($In_2O_3$), and tin oxide ($SnO_2$) as main components, or a light-transmitting conductive layer made of ITO as a main material and containing silicon (Si). As illustrated in FIGS. 9 and 10, the polarization plate PL2 is provided on the shield conductive layer 51.

A first optical element OD1 including the polarization plate PL1 is disposed on the outer surface of the first substrate 10 or on the surface thereof facing the light source device 6 (refer to FIG. 2). A second optical element OD2 including the polarization plate PL2 is disposed on the outer surface of the second substrate 20 or the surface thereof on the observation position side. A first polarization axis of the polarization plate PL1 and a second polarization axis of the polarization plate PL2 have a crossed Nicol positional relation in plan view. The first optical element OD1 and the second optical element OD2 may include another optical layer such as a retardation film.

The first substrate 10 and the second substrate 20 are arranged with a predetermined gap therebetween. A space between the first substrate 10 and the second substrate 20 is sealed by a seal member 69. The liquid crystal layer LC is provided in the space enclosed by the first substrate 10, the second substrate 20, and the seal member 69. The liquid crystal layer LC modulates light that passes therethrough in accordance with an electric field state, and liquid crystal in a transverse electric field mode such as in-plane switching (IPS) including fringe field switching (FFS) is used therefor. Orientation films (not illustrated) are respectively arranged between the liquid crystal layer LC and the array substrate SUB1 and between the liquid crystal layer LC and the counter substrate SUB2 illustrated in FIG. 8. In the embodiment, the liquid crystal layer LC is driven by transverse electric fields generated between the pixel electrodes PE and the common electrodes CE.

The light source device 6 illustrated in FIGS. 1 and 2 is provided on the lower side of the first substrate 10. Light from the light source device 6 passes through the array substrate SUB1 and is modulated in accordance with a state of the liquid crystal at the corresponding position, and a transmission state to the display surface changes depending on places. An image is thereby displayed in the display region AA of the display panel 2.

The following describes the XVII-XVII' cross-section illustrated in FIG. 9 and the XIV-XIV' cross-section illustrated in FIG. 10 in detail. In FIGS. 9 and 10, the array substrate SUB1 includes, as a base body, the first substrate 10 such as a glass substrate or a resin substrate having a light-transmitting property and an insulating property. The array substrate SUB1 includes a first insulating layer 11, a second insulating layer 12, a third insulating layer 13, the signal lines SGL, the pixel electrodes PE, the common electrodes CE, and a first orientation film AL1 on the side of the first substrate 10 that faces the counter substrate SUB2.

The scan lines GCL and gate electrodes of the switching elements Tr (refer to FIG. 3) are provided on the first substrate 10, although they are not observed in the cross-sections in FIGS. 9 and 10. The first insulating layer 11 illustrated in FIGS. 9 and 10 covers the scan lines GCL and the gate electrodes. An insulating layer made of an inorganic material having a light-transmitting property, such as silicon oxide or silicon nitride, may be further provided under the first insulating layer 11, the scan lines GCL, and the gate electrodes.

Semiconductor layers of the switching elements Tr are stacked on the first insulating layer 11, although the semiconductor layers are not observed in the cross-sections of FIGS. 9 and 10. The semiconductor layers are formed with amorphous silicon, for example, but may be formed with polysilicon or oxide semiconductor.

As illustrated in FIGS. 9 and 10, the second insulating layer 12 covers the signal lines SGL. The second insulating layer 12 is made of a resin material having a light-transmitting property, such as acrylic resin, and has a film thickness greater than those of the other insulating films made of inorganic materials. The second insulating layer 12 may be made of an inorganic material.

A source electrode of each of the switching elements Tr covering part of the semiconductor layer and a drain electrode of each of the switching elements Tr covering part of the semiconductor layer are provided on the second insulating layer 12, although those electrodes are not observed in the cross-sections of FIGS. 9 and 10. The drain electrode is made of the same material as those of the signal lines SGL. The third insulating layer 13 is provided on the semiconductor layer of the switching element Tr (refer to FIG. 3). The switching element Tr explained above is of a bottom gate type, but may be of a top gate type.

The common electrodes CE are located on the second insulating layer 12. In FIGS. 9 and 10, the common electrodes CE face the signal lines SGL with the third insulating layer 13 interposed therebetween. The third insulating layer 13 is made of an inorganic material having a light-transmitting property, such as silicon oxide or silicon nitride, for example.

The third insulating layer 13 covers the common electrodes CE. The third insulating layer 13 is made of an inorganic material having a light-transmitting property, such as silicon oxide or silicon nitride, for example.

The pixel electrodes PE are located on the third insulating layer 13 and face the common electrodes CE with the third insulating layer 13 interposed therebetween. The pixel electrodes PE and the common electrodes CE are made of a conductive material having a light-transmitting property, such as indium tin oxide (ITO) or indium zinc oxide (IZO), for example. The first orientation film AL1 covers the pixel electrodes PE. The first orientation film AL1 also covers the third insulating layer 13.

The counter substrate SUB2 includes, as a base body, the second substrate 20 having a light-transmitting property and an insulating property, such as a glass substrate or a resin substrate. The counter substrate SUB2 includes the light shielding layers BM, the color filters CFR, CFG, and CFB, an overcoat layer OC, and a second orientation film AL2 on a side of the second substrate 20 facing the array substrate SUB1.

As illustrated in FIGS. 9 and 10, the light shielding layers BM are located on the side of the second substrate 20 facing the array substrate SUB1. As illustrated in FIGS. 9 and 10, the light shielding layers BM define apertures each of which face the pixel electrode PE. The light shielding layers BM are made of a black resin material or a metal material having a light shielding property.

The color filters CFR, CFG, and CFB are located on the side of the second substrate 20 facing the array substrate SUB1, and end portions thereof overlap the light shielding layers BM. As an example, the color filters CFR, CFG, and CFB are made of resin materials colored in blue, red, and green.

The overcoat layer OC covers the color filters CFR, CFG, and CFB. The overcoat layer OC is made of a resin material having a light-transmitting property. The second orientation film AL2 covers the overcoat layer OC. The first orientation film AL1 and the second orientation film AL2 are made of a horizontally oriented material, for example.

The counter substrate SUB2 includes the light shielding layers BM and the color filters CFR, CFG, and CFB. The light shielding layers BM are arranged in a region facing a wiring portion including the scan lines GCL, the signal lines SGL, and the switching elements Tr illustrated in FIG. 3.

In FIGS. 9 and 10, the counter substrate SUB2 includes the color filters CFR, CFG, and CFB in three colors. Alternatively, the counter substrate SUB2 may include color filters in four or more colors that include color filters in, for example, white, clear, yellow, magenta, and cyan other than blue, red, and green. The array substrate SUB1 may include these color filters CFR, CFG, and CFB.

The array substrate SUB1 and the counter substrate SUB2 are arranged such that the first orientation film AL1 and the second orientation film AL2 face each other. The liquid crystal layer LC is sealed between the first orientation film AL1 and the second orientation film AL2. The liquid crystal layer LC is made of a negative liquid crystal material having a negative dielectric anisotropy or a positive liquid crystal material having a positive dielectric anisotropy.

The array substrate SUB1 faces the light source device 6 (refer to FIG. 1) while the counter substrate SUB2 is located on the display surface side. As the light source device 6, various forms of light sources are applicable. For example, the light source device 6 has a configuration in which a plurality of light emitting diodes (LEDs) as light sources 61 are arranged in a matrix with a row-column configuration. The light sources 61 are provided such that their lighting intensity and lighting timing are individually controllable at least on a partial region basis, which is described later. The light sources 61 may be provided such that their lighting intensity and lighting timing are individually controllable on a smaller control unit basis.

For example, when the liquid crystal layer LC is made of the negative liquid crystal material and no voltage is applied to the liquid crystal layer LC, liquid crystal molecules LM are initially oriented in such a direction that long axes thereof are along the first direction Dx in a Dx-Dy plane illustrated in FIG. 4. On the other hand, when a voltage is applied to the liquid crystal layer LC, that is, when the liquid crystal layer LC is in an ON state in which the electric fields are formed between the pixel electrodes PE and the common electrodes CE, the liquid crystal molecules LM are influenced by the electric fields and the orientation states thereof are changed. When linearly polarized light enters the liquid crystal layer LC in the ON state, a polarization state of the linearly polarized light is changed in accordance with the orientation states of the liquid crystal molecules LM while the light is passing through the liquid crystal layer LC.

The display panel 2 in the embodiment has the first temperature detection wirings SMX (refer to FIG. 4) including conductive thin lines 33 extending in the first direction Dx, and the second temperature detection wirings SMY (refer to FIG. 5) including the conductive thin lines 33 extending in the second direction Dy.

The following describes the first temperature detection wiring SMX in detail. As illustrated in FIG. 4, each first temperature detection wiring SMX includes a plurality of conductive thin lines 33, a first connection line 34a, and a second connection line 34b. First ends of the conductive thin lines 33 are electrically coupled to each other by the first connection line 34a while second ends of the conductive thin lines 33 are electrically coupled to each other by the second connection line 34b.

Each conductive thin line 33 is formed with a metal layer made of one or more elements selected from aluminum (Al), copper (Cu), silver (Ag), molybdenum (Mo), chromium (Cr), titanium (Ti), and tungsten (W). Alternatively, the conductive thin line 33 is formed with a metal layer made of an alloy containing one or more elements selected from aluminum (Al), copper (Cu), silver (Ag), molybdenum (Mo), chromium (Cr), titanium (Ti), and tungsten (W). The conductive thin line 33 can be made of an aluminum alloy such as AlNd, AlCu, AlSi, and AlSiCu, for example. The conductive thin line 33 may be a multilayered body formed by stacking a plurality of conductive layers made of the above-described metal material or the alloy containing one or more of the materials described above.

A width Wsm of the conductive thin line 33 (included in the first temperature detection wiring SMX) illustrated in FIGS. 9 and 10 is a length orthogonal to the lengthwise direction. The width Wsm is preferably in a range of 1 μm to 10 μm, and more preferably in a range of 1 μm to 5 μm, for example. When the width Wsm is equal to or smaller than 10 μm, the width Wsm can be set to be smaller than a width Wbm of the light shielding layer BM. This is preferable because the probability of decrease in aperture ratio is lowered. When the width Wsm is equal to or larger than 1 μm, the shape of the conductive thin line 33 (the first temperature detection wiring SMX) is made stable. This is also preferable because the probability that the conductive thin line 33 is disconnected is reduced.

The first connection line 34a is coupled to a first line 37a. The second connection line 34b is coupled to a second line 37b. In the embodiment, the first line 37a is coupled to a first end of the first temperature detection wiring SMX while the second line 37b is coupled to a second end of the first temperature detection wiring SMX. The first line 37a is provided along a peripheral region FR. The second line 37b is provided along the peripheral region FR.

The first line 37a and the second line 37b that are coupled to the first temperature detection wiring SMX are coupled to different terminal portions 36. The first line 37a coupled to the first end of the first temperature detection wiring SMX and the second line 37b coupled to the second end of the first temperature detection wiring SMX are led out to the flexible substrate 72 through the corresponding terminal portions 36. The first lines 37a of the first temperature detection wirings SMX and the second lines 37b of the first temperature detection wirings SMX are electrically coupled to the temperature detection controller 120 with the flexible substrate 72 interposed therebetween. The temperature detection controller 120 detects a resistance change that varies in accordance with a temperature change between the first line 37a coupled to the first end of the first temperature detection wiring SMX and the second line 37b coupled to the second end of the first temperature detection wiring SMX. The resistance change can be detected in an analog form as a change in voltage with respect to a constant current. The analog voltage change is converted to a digital signal by analog-to-digital (A/D) conversion, which is described later.

The first line 37a and the second line 37b can be made of the same material as that used for the conductive thin lines 33, such as the metal material, the alloy, or the like. It is sufficient that the first line 37a and the second line 37b are made of a material having preferable conductivity. A material different from that of the conductive thin lines 33 may be used for the first line 37a and the second line 37b.

The first ends of the conductive thin lines 33 are electrically coupled to each other by being connected to the first connection line 34a. The second ends of the conductive thin lines 33 are electrically coupled to each other by being connected to the second connection line 34b. The first line 37a is electrically coupled to the first connection line 34a while the second line 37b is electrically coupled to the second connection line 34b. This configuration allows the first temperature detection wiring SMX to detect a partial heat generation state of the display region AA in a predetermined area. The resistance value of the first temperature detection wiring SMX is adjusted based on the number of conductive thin lines 33.

The conductive thin lines 33 are arranged at positions overlapping the light shielding layers BM in plan view. As illustrated in FIG. 9, the conductive thin lines 33 extend in the first direction along the light shielding layers BM. The planar shape of the conductive thin line 33 is not limited to a linear metal thin line shape. When the signal line SGL has, for example, a zigzag shape or a wavy line shape in plan view, the planar shape of the conductive thin line 33 may be the zigzag shape or the wavy line shape along the shape of the signal line SGL.

As illustrated in FIG. 4, the width of a slit SPA between the adjacent first temperature detection wirings SMX in the second direction Dy is desirably the same as an interval between the adjacent conductive thin lines 33. This causes the intervals between the conductive thin lines 33 to be made uniform in the plane, thereby reducing undesired diffracted light.

In FIG. 9, eight light shielding layers BM not overlapping any conductive thin lines 33 are formed between one light shielding layer BM overlapping the conductive thin line 33 and another light shielding layer BM overlapping the conductive thin line 33. Dummy conductive thin lines that are not electrically coupled to the first lines 37a or the second lines 37b may be provided, and the dummy conductive thin lines may overlap the light shielding layers BM not overlapping any conductive thin lines 33.

The shield conductive layer 51 (refer to FIG. 8) is provided to reduce static electricity that would be generated when the display panel 2 is manufactured and used. In a case where the shield conductive layer 51 is not provided, when electromagnetic noise such as static electricity enters from the outside, the electromagnetic noise reduction effect may not be sufficient because there are regions with no conductive thin lines 33.

The shield conductive layer 51 is formed on substantially the entire surface of the second substrate 20 and is provided over the entire surface of the display region AA and the peripheral region FR. That is, the shield conductive layer 51 overlaps the conductive thin lines 33 at parts where the conductive thin lines 33 are provided in the first direction Dx-second direction Dy viewpoint. The shield conductive layer 51 does not overlap the conductive thin lines 33 at parts where the conductive thin lines 33 are not provided in the first direction Dx-second direction Dy viewpoint.

The shield conductive layer 51 is preferably disposed to extend to end portions of the second substrate 20 (refer to FIG. 8). Furthermore, the shield conductive layer 51 is electrically coupled from the peripheral region FR to a power supply or a fixed potential such as ground by a conductive tape or the like.

The shield conductive layer 51 is preferably provided at a position overlapping the first connection lines 34a, the second connection lines 34b, the first lines 37a, and the second lines 37b. The area of the shield conductive layer 51 in plan view is larger than the total area of the conductive thin lines 33.

The following describes the second temperature detection wiring SMY in detail. As illustrated in FIG. 5, each second temperature detection wiring SMY includes a plurality of conductive thin lines 33, a third connection line 34c, and a fourth connection line 34d. The conductive thin lines 33 extend in the second direction Dy to overlap the display area AA. First ends of the conductive thin lines 33 are electrically coupled to each other by the third connection line 34c while second ends of the conductive thin lines 33 are electrically coupled to each other by the fourth connection line 34d.

As illustrated in FIG. 5, the width of a slit SPB between the adjacent second temperature detection wiring SMY in the first direction Dx is desirably the same as an interval between the adjacent conductive thin lines 33. This causes the intervals between the conductive thin lines 33 to be made uniform in the plane, thereby reducing undesired diffracted light.

The third connection line 34c is coupled to a third line 37c. The fourth connection line 34d is coupled to a fourth line 37d. In the embodiment, the third line 37c is coupled to a first end of the second temperature detection wiring SMY while the fourth line 37d is coupled to a second end of the second temperature detection wiring SMY. The third line 37c is provided along the peripheral region FR. The fourth line 37d is provided along the peripheral region FR.

The third line 37c and the fourth line 37d that are coupled to the second temperature detection wiring SMY are coupled to different terminal portions 36. The third line 37c coupled to the first end of the second temperature detection wiring SMY and the fourth line 37d coupled to the second end of the second temperature detection wiring SMY are led out to the flexible substrate 72 through the corresponding terminal portions 36. The third lines 37c of the second temperature detection wirings SMY and the fourth lines 37d of the second temperature detection wirings SMY are electrically coupled to the temperature detection controller 120 through the flexible substrate 72. The temperature detection controller 120 detects a resistance change that varies in accordance with a temperature change between the third line 37c coupled to the first end of the second temperature detection wiring SMY and the fourth line 37d coupled to the second end of the second temperature detection wiring SMY.

The third lines 37c and the fourth lines 37d can be made of the same material as that used for the conductive thin lines 33, such as the metal material, the alloy, or the like. It is sufficient that the third line 37c and the fourth line 37d are made of a material having preferable conductivity. A material different from that of the conductive thin lines 33 may be used for the third line 37c and the fourth line 37d.

The first ends of the conductive thin lines 33 are electrically coupled to each other by being connected to the third connection line 34c. The second ends of the conductive thin lines 33 are electrically coupled to each other by being connected to the fourth connection line 34d. The third line 37c is electrically coupled to the third connection line 34c while the fourth line 37d is electrically coupled to the fourth connection line 34d. This configuration allows the second temperature detection wiring SMY to detect a partial heat generation state of the display region AA in a range of a predetermined area. The resistance value of the second temperature detection wiring SMY is adjusted based on the number of conductive thin lines 33.

As illustrated in FIG. 6, when the first temperature detection wirings SMX and the second temperature detection wirings SMY are superimposed in plan view, a temperature detection region SM is formed in which one of the first temperature detection wirings SMX and one of the second temperature detection wirings SMY intersect in a three-dimensional manner. The temperature detection regions SM are arranged in a matrix with a row-column configuration. This configuration allows the display panel 2 in the embodiment to more precisely determine the position of sunlight LL that is focused onto the display area AA. The configuration described above functions as a temperature detector 30, in which the first temperature detection wirings SMX and the second temperature detection wirings SMY forming the temperature detection regions SM and functioning as a plurality of temperature sensors.

As illustrated in FIGS. 9 and 10, the second temperature detection wirings SMY are formed on the protective layer 38, and the protective layer 39 covers the second temperature detection wirings SMY. The protective layer 38 electrically insulates the first temperature detection wirings SMX from the second temperature detection wirings SMY. The protective layer 39 is made of the same material as the protective layer 38 and electrically insulates the shield conductive layer 51 from the second temperature detection wirings SMY.

As illustrated in FIG. 10, the second temperature detection wirings SMY are arranged at positions overlapping the scan lines GCL and the light-shielding layers BM. As illustrated in FIG. 10, the second temperature detection wirings SMY (the conductive thin lines 33) extend in the second direction Dy along the light shielding layers BM. The planar shape of the conductive thin line 33 of the second temperature detection wiring SMY, which is illustrated in FIG. 5, is not limited to a linear metal thin line shape. When the scan line GCL has, for example, a zigzag shape or a wavy line shape in plan view, the planar shape of the conductive thin line 33 may be the zigzag shape or the wavy line shape along the shape of the scan line GCL.

As explained above, the display panel 2 in the embodiment includes the substrate having the display region AA, the first temperature detection wirings SMX, and the second temperature detection wirings SMY. Each of the first temperature detection wiring SMX and the second temperature detection wiring SMY includes the conductive thin lines 33 arranged at positions overlapping the display region AA in plan view. The light shielding layers BM are arranged so as to extend in the first direction Dx in the display region AA. The conductive thin lines 33 of the first temperature detection wirings SMX are arranged at positions overlapping the light shielding layers BM and extend in the first direction Dx along the light shielding layers BM. The conductive thin lines 33 of the second temperature detection wirings SMY are arranged at positions overlapping the light shielding layers BM and extend in the second direction Dy along the light shielding layers BM. This configuration allows the temperature detection regions SM, which are formed by the combination of the first temperature detection wirings SMX and the second temperature detection wirings SMY, to detect the partial heat generation state of the display region AA without lowering the transmittance of the display region AA, because the temperature detection regions SM do not block the apertures of the sub pixels SPix.

The conductive thin lines 33 are formed on the second substrate 20 in the embodiment. The protective layer 38 is formed on the conductive thin lines 33. The protective layer 38 is made of the light-transmitting resin such as acrylic resin having an insulating property. The shield conductive layer 51 is formed on the protective layer 38. In other words, the first temperature detection wirings SMX, the second temperature detection wirings SMY, and the shield conductive layer 51 are on the upper side of the second substrate 20 while the first temperature detection wirings SMX and the second temperature detection wirings SMY are stacked on the lower side of the shield conductive layer 51. The shield conductive layer 51 and the second temperature detection wirings SMY are insulated from each other by the protective layer 39. The second temperature detection wirings SMY and the first temperature detection wirings SMX are insulated from each other by the protective layer 38. As a result, in a case where heat and light act simultaneously on the shield conductive layer 51, the first temperature detection wirings SMX, and the second temperature detection wirings SMY, and even though a resistance change occurs in the shield conductive layer 51 depending on a temperature change caused by light, the resistance changes in the first temperature detection wirings SMX and the second temperature detection wirings SMY depending on the temperature change caused by heat, are not affected.

The shield conductive layer 51 is made of one or more materials selected from ITO, indium zinc oxide (IZO), and SnO, for examples.

The conductive thin line 33 may be a multilayered body formed by stacking at least two or more layers among: one or more metal layers each of which is made of an element selected from aluminum (Al), copper (Cu), silver (Ag), molybdenum (Mo), chromium (Cr), titanium (Ti), and tungsten (W), and a metal layer of an alloy containing these elements. Alternatively, the conductive thin line 33 may be a multilayered body formed by stacking at least two or more layers among: one or more metal layers each of which is made of an element selected from aluminum (Al), copper (Cu), silver (Ag), molybdenum (Mo), chromium (Cr), titanium (Ti), and tungsten (W); a metal layer of an alloy containing these elements; an oxide layer containing, as main components, tin oxide ($SnO_2$) and silicon dioxide ($SiO_2$); and an oxide layer containing, as main components, gallium oxide ($Ga_2O_3$), indium oxide ($In_2O_3$), and tin oxide ($SnO_2$). When the conductive thin line 33 is the multilayered body, the materials are selected such that light reflection by a certain layer is less than that by the layer under the certain layer. As a result, the visible light reflectivity of a certain layer is lower than that of the layer under the certain layer, and the color of the certain layer is closer to black than that of the layer under the certain layer.

The specific configuration of the temperature detector 30 is not limited to the combination of the first temperature detection wirings SMX and the second temperature detection wirings SMY. For example, as illustrated in FIG. 7, a temperature detector 30A including a plurality of temperature detection electrodes SX arranged in a matrix with a row-column configuration may be provided instead of the temperature detector 30 described above. The temperature detection electrodes SX are each coupled to the terminal portions 36 through two lines of a first line 37e and a second line 37f. The first line 37e and the second line 37f that are coupled to the temperature detection electrode SX are coupled to different terminal portions 36. In other words, the temperature detector 30A is configured such that the resistance change of each temperature detection electrode SX, which varies in accordance with the temperature change of each temperature detection electrode SX, can be individually detected. This allows each of the temperature detection electrodes SX to function in the same manner as each of the temperature detection regions SM described above. It is desirable that a material having a light-transmitting property such as ITO be used for the temperature detection electrode SX. The same material as the first line 37a and the second line 37b can be used for the first line 37e and the second line 37f. The specific shape of the temperature detection electrode SX is not limited to a plate-like shape or a thin film-like shape. For example, a layer of metal or compound thin lines having a shape such as that of the first temperature detection wiring SMX and the second temperature detection wiring SMY may be arranged in a matrix with a row-column configuration in the same manner as the temperature detection electrode SX illustrated in FIG. 7. The specific shape of the thin line is not limited to that of the first temperature detection wiring SMX and the second temperature detection wiring SMY. The other shapes such as a mesh shape may be applicable, for example. The shape can be modified as appropriate. The number of first temperature detection wirings SMX aligned in the first direction Dx, the number of second temperature detection wirings SMY aligned in the second direction Dy, the number of temperature detection electrodes SX aligned in the first direction Dx, and the number of temperature detection electrodes SX aligned in the second direction Dy are each an arbitrary number that is two or more, and can be modified as appropriate. The outer shapes of the first temperature detection wiring SMX, the second temperature detection wiring SMY, and the temperature detection electrode SX in the first direction Dx-second direction Dy plan view are not limited to a rectangular shape. The shape may be a linear shape, a triangular shape, a shape of a polygon of pentagonal or more, an ellipse, or a regular circle. Any other shapes can be employed that allow the first temperature detection wirings SMX, the second temperature detection wirings SMY, and the temperature detection electrodes SX to be superimposed on the display region AA. The arrangement of the temperature detection areas SM formed by the combination of the first temperature detection wirings SMX and the second temperature detection wirings SMY, and the arrangement of the temperature detection electrodes SX may cover the entire display region AA or a part of the display region AA. For example, when the HUD device 1 is designed in a manner such that the region where there is a possibility of a temperature rise due to the incident of sunlight LL is limited to a part of the display region AA, the temperature detection regions SM formed by the combination of the first temperature detection wirings SMX and the second temperature detection wirings SMY, and the temperature detection electrodes SX are arranged to cover the part.

The control device 110 illustrated in FIG. 2 outputs a master clock, a horizontal synchronization signal, a vertical synchronization signal, pixel signals, and a drive command signal for the light source device 6 to the DDIC 19, for example. The pixel signal is a combination of gradation values of red (R), green (G), and blue (B), for example.

As illustrated in FIG. 2, the display panel 2 includes the DDIC 19. The DDIC 19 controls the display panel 2, the light source device 6, and the temperature detector 30.

Figure 11:
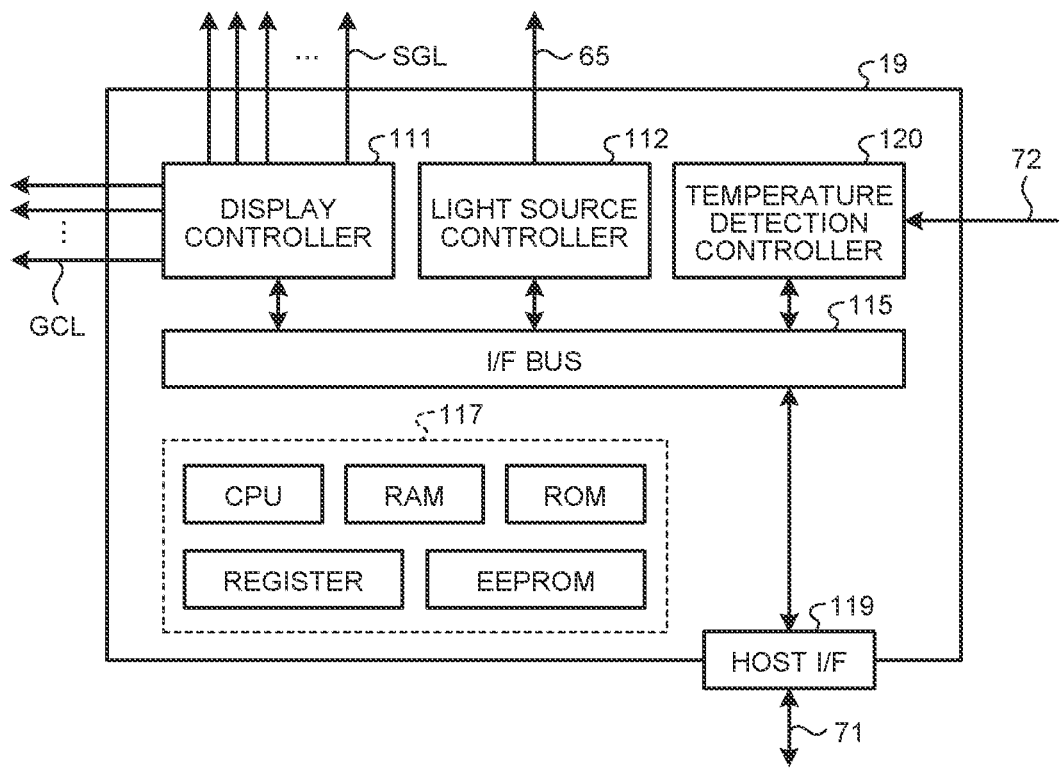
FIG. 11 is a block diagram illustrating an exemplary configuration of a DDIC and an example of input and output lines that are coupled to the DDIC.

FIG. 11 is a block diagram illustrating an exemplary configuration of the DDIC 19 and an example of input and output lines coupled to the DDIC 19. As illustrated in FIG. 11, the DDIC 19 is an integrated circuit in which the functions of a display controller 111, a light source controller 112, and the temperature detection controller 120 are packaged as a single component, for example.

The display controller 111 functions as a gate driver to sequentially select the scan lines GCL. The display controller 111 applies a scan signal to the gates of the switching elements Tr of the sub pixels SPix via the selected scan line GCL. One row (one horizontal line) of the sub pixels SPix is thereby selected as a display drive target row by row.

The display controller 111 also functions as a source driver to supply the pixel signals to the sub pixels SPix included in the selected horizontal line via the signal lines SGL. Display is performed with these sub pixels SPix on a horizontal line basis in accordance with the supplied pixel signals.

The display controller 111 functions as a common electrode driver to apply a common potential to the common electrodes CE. The common potential is a direct-current (DC) voltage signal that is commonly applied to the sub pixels SPix.

As explained above, the display controller 111 functions as the gate driver, the source driver, and the common electrode driver. The display controller 111 may be configured in a manner such that the gate driver, the source driver, and the common electrode driver are separated from one another. At least one of the gate driver, the source driver, and the common electrode driver may be formed on the first substrate 10 using a thin film transistor (TFT).

The light source controller 112 controls operations of the light sources 61 in synchronization with the display controller 111. The light source controller 112 is coupled to the light sources 61 via wiring 65. The display controller 111 has a function of controlling output gradation values of some or all of the pixels based on light emission amounts of the light sources 61 that are controlled by the light source controller 112.

The temperature detection controller 120 performs the A/D conversion on the resistances of the first temperature detection wirings SMX and the second temperature detection wirings SMY to generate temperature detection signals. The temperature detection controller 120 detects the temperatures in the display region AA based on the temperature detection signals. Processing according to the detection results of the temperatures (abnormality countermeasure processing) is described later.

As illustrated in FIG. 11, the signal lines SGL, the scan lines GCL, the first temperature detection wirings SMX, and the second temperature detection wirings SMY of the display panel are coupled to the control IC (the DDIC 19). Specifically, the signal lines SGL and the scan lines GCL are coupled to the display controller 111 of the DDIC 19. The first temperature detection wirings SMX and the second temperature detection wirings SMY are coupled to the temperature detection controller 120 of the DDIC 19 with the flexible substrate 72 interposed therebetween.

The display controller 111, the light source controller 112, and the temperature detection controller 120 are coupled with each other through an interface (I/F) bus 115 to enable signal transmission in the DDIC 19. The I/F bus 115 is coupled to a host I/F 119 to enable signal transmission with the host I/F 119. The host I/F 119 is provided to allow the DDIC 19 to be coupled to the flexible substrate 71. Various signals input from the control device 110 are transmitted to the display controller 111 and the like through the flexible substrate 71, the host I/F 119, and the I/F bus 115. When feedback signals are transmitted from one or more of the display controller 111, the light source controller 112, and the temperature detection controller 120 to the control device 110, they are transmitted through the I/F bus 115, the host I/F 119, and the flexible substrate 71.

The DDIC 19 further includes a processor 117. As exemplified in FIG. 11, the processor 117 includes a central processing unit (CPU), a random access memory (RAM), a read only memory (ROM), an electrically erasable programmable read only memory (EEPROM), and a register. The processor 117 includes circuitry mounted to accommodate these various configurations. The DDIC 19 may include a timing controller that synchronizes the operating timing of the various sections in the DDIC 19, the controller being not illustrated. The circuit such as the processor 117 may further include the function of the timing controller.

Figure 12:
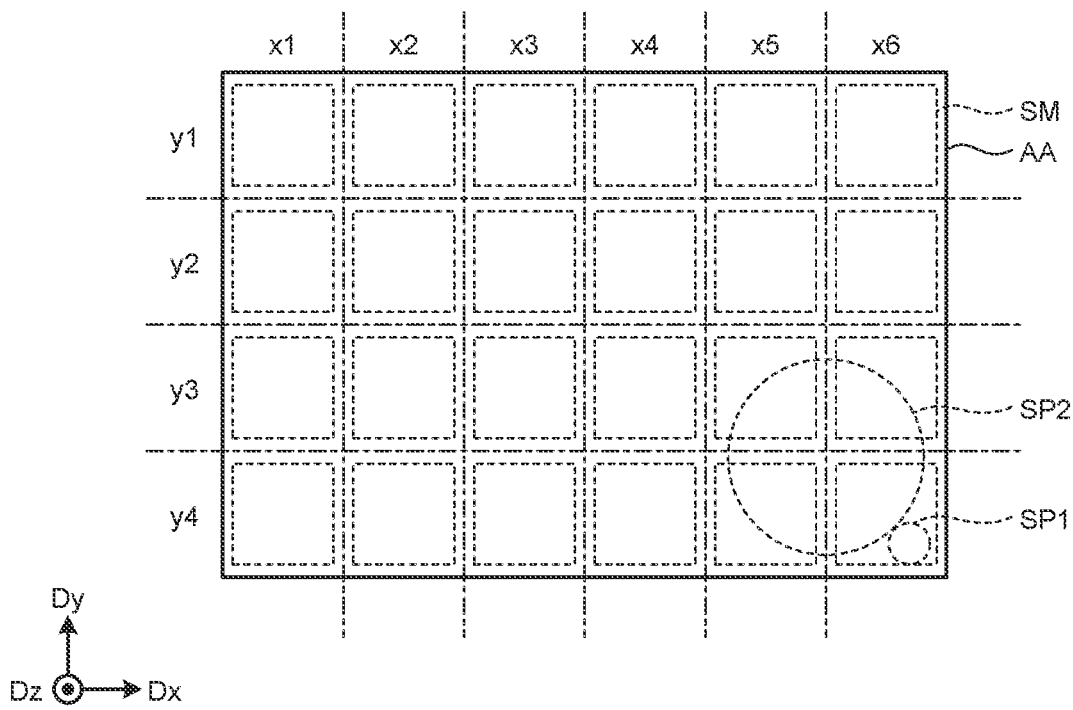
FIG. 12 is a schematic diagram illustrating a relation between a display region and a plurality of temperature detection regions.

FIG. 12 is a schematic diagram illustrating a relation between the display region AA and the temperature detection regions SM. As illustrated in FIG. 12, the temperature detection regions SM corresponding to the intersection positions of the first temperature detection wirings SMX and the second temperature detection wirings SMY are formed in a matrix with a row-column configuration in a manner such that they overlap the display region AA. FIG. 12 illustrates, as a schematic example, a total of 24 temperature detection regions SM, that is, six temperature detection regions SM are aligned in the first direction Dx and four temperature detection regions SM are aligned in the second direction Dy. The actual number of temperature detection regions SM is not limited to the example. The number of temperature detection regions SM aligned in the first direction Dx and the number of temperature detection regions SM aligned in the second direction Dy are arbitrary.

With the temperature detection regions SM formed in a matrix with a row-column configuration as illustrated in FIG. 12, the temperature of the display region AA can be detected for each of different regions that overlap different temperature detection regions SM. Thus, in a case where the temperature detection regions SM are arranged as illustrated in FIG. 12, the temperature can be individually detected for each of the partial regions in the display region AA that is represented by the combination of one of the coordinates x1, x2, x3, x4, x5, and x6 along the first direction Dx and one of the coordinates y1, y2, y3, and y4 along the second direction Dy.

The partial regions overlap the temperature detection regions SM, respectively. The display controller 111 in the embodiment is capable of controlling the display region AA on a partial region basis. Specifically, the partial regions along the first direction Dx are coupled to different signal lines SGL. The partial regions along the second direction Dy share one of the signal lines SGL. The partial regions along the second direction Dy are coupled to different scan lines GCL. The partial regions along the first direction Dx share one of the scan lines GCL. Thus, the display controller 111 is capable of controlling the update of a display output of the partial regions in correspondence with the signal lines SGL provided with the pixel signals in response to the timing of the application of the drive signal to the scan line GCL.

Figure 13:
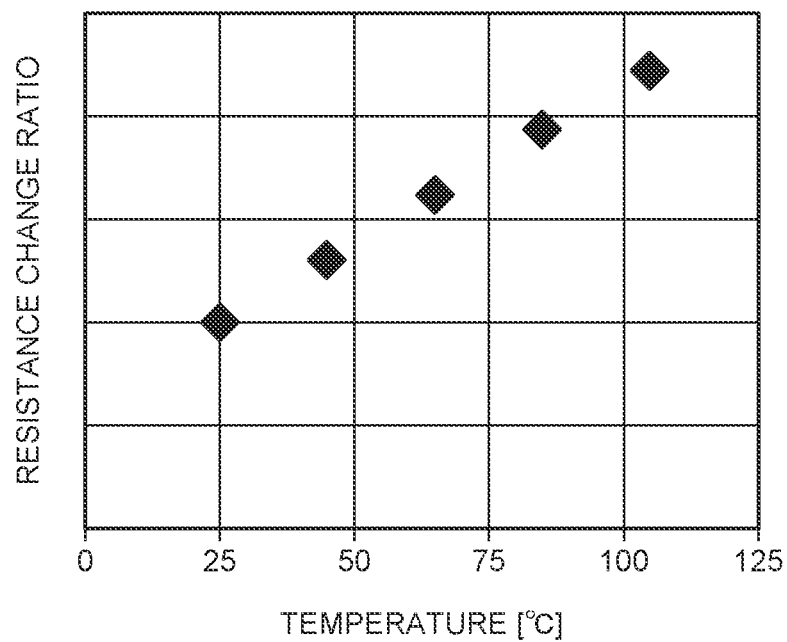
FIG. 13 is a graph illustrating a resistance change ratio of one temperature detection wiring with respect to temperature.

FIG. 13 is a graph illustrating a resistance change ratio of one temperature detection wiring with respect to temperature. As illustrated in FIG. 13, the resistance change ratio of the first temperature detection wiring SMX or the second temperature detection wiring SMY relative to a resistance value at a reference temperature changes linearly in accordance with the temperature, for example.

As illustrated in FIG. 1, sunlight LL may enter an opening 4S of the housing 4 depending on a position of the sun SUN relative to the HUD device 1. The sunlight LL is guided by the optical system RM, then focused as it travels toward the display panel 2, and hits a part of the display region AA in some cases. The focused sunlight possibly deteriorates the display panel 2, and it is therefore desired that the partial heat generation state of the display region is detected.

In the embodiment, as exemplified in FIG. 12, the temperature detection regions SM are aligned at the positions overlapping the display region AA in plan view, thereby making it possible to grasp the position to which the sunlight LL hits in the display region AA based on the temperature detection region SM with a temperature rise.

For example, when the sunlight LL is focused onto a light-focused region SP1 illustrated in FIG. 12, the resistances of the first temperature detection wiring SMX and the second temperature detection wiring SMY that overlap the temperature detection region SM corresponding to the partial region (x6,y4) become resistances corresponding to the temperature rise due to the sunlight LL. In this case, (x6,y4) is coordinates represented by the combination of coordinate x6 in the first direction Dx and coordinate y4 in the second direction Dy. For another example, when the sunlight LL is focused onto the light-focused region SP2 illustrated in FIG. 12, the resistances of the first temperature detection wirings SMX and the second temperature detection wirings SMY that overlap the temperature detection regions SM corresponding to the four partial regions (x5,y3), (x5,y4), (x6,y3) and (x6,y4) become resistances corresponding to the temperature rise due to the sunlight LL.

The temperature detection controller 120 performs A/D conversion on signals from the first temperature detection wirings SMX and the second temperature detection wirings SMY and generates the temperature detection signal for each of the temperature detection regions SM. The signals from the first temperature detection wirings SMX and the second temperature detection wirings SMY are analog voltages according to a constant current for the first temperature detection wirings SMX and the second temperature detection wirings SMY, for example. The voltage varies in accordance with the change in resistance, and therefore corresponds to the temperature. It is possible, by performing A/D conversion on the voltage, to obtain a digital signal corresponding to the temperature. The digital signal is a signal that can be converted to a voltage value. The voltage value serves as information indicating the temperature of the first temperature detection wiring SMX or the second temperature detection wiring SMY in which a resistance has changed corresponding to the temperature.

The temperature detection signal serves as a signal indicating the temperature detected for each temperature detection region SM based on the combination of the voltage of the first temperature detection wiring SMX and the voltage of the second temperature detection wiring SMY.

Figure 14:
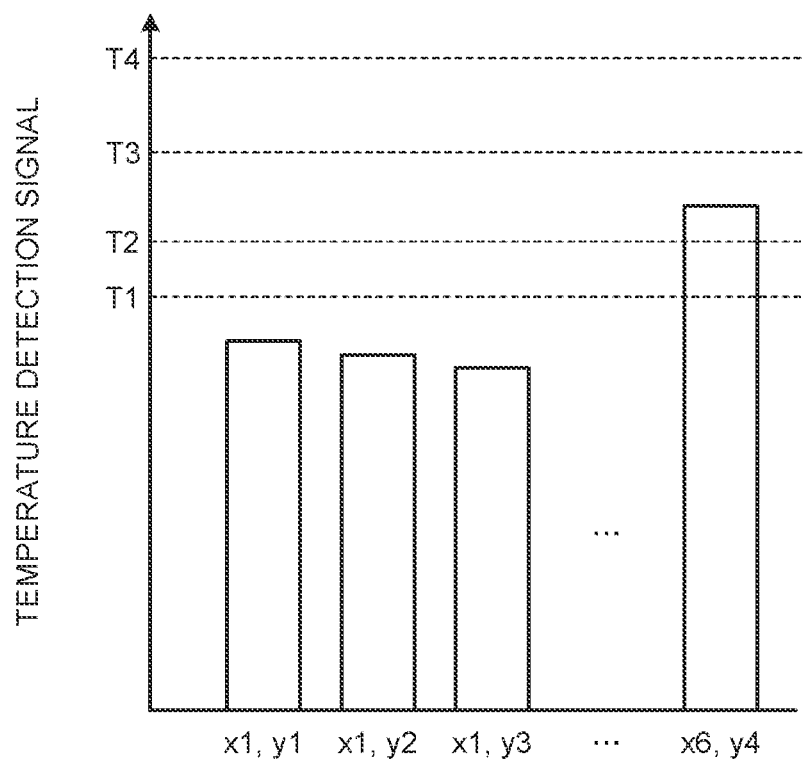
FIG. 14 is a schematic graph illustrating an exemplary relation between the temperature indicated by a temperature detection signal of each of the temperature detection regions and temperature threshold values.

FIG. 14 is a schematic graph illustrating an exemplary relation between the temperature indicated by the temperature detection signal in each of the temperature detection regions SM and the temperature threshold values. As illustrated in FIG. 14, the temperature indicated by the temperature detection signal generated in each temperature detection area SM serves as the temperature of each of the partial regions specified by the combination of the coordinates in the first direction Dx and the second direction Dy illustrated in FIG. 12. Such a temperature is compared with predetermined temperature threshold values such as the threshold temperature T1, the first temperature T2, the second temperature T3, and the third temperature T4, thereby identifying a level of the temperature of each partial region relative to these temperature threshold values. For example, any one of the threshold temperature T1, the first temperature T2, the second temperature T3, and the third temperature T4 is employed as a criterion for an abnormal temperature. The abnormal temperature, thus, can be detected based on the comparison between the temperature detected in each temperature detection region SM and the temperature indicated by the employed threshold value. Hereinafter, "a partial region in which the abnormal temperature is detected" and "a partial region with an abnormal temperature" denote a partial region that overlaps a temperature detection region SM in which the abnormal temperature is detected.

In the embodiment, the threshold temperature T1 is used as the threshold value for the abnormal temperature. Specifically, in the embodiment, the threshold temperature T1 is employed as the temperature that triggers the start of the abnormality countermeasure processing described later.

In the example illustrated in FIG. 14, the third temperature T4 is higher than the threshold temperature T1, the first temperature T2, and the second temperature T3. The second temperature T3 is higher than the threshold temperature T1 and the first temperature T2. The first temperature T2 is higher than the threshold temperature T1. The threshold temperature T1 is 50 degrees Celsius [° C.], for example. The first temperature T2 is 60 degrees Celsius [° C.], for example. The second temperature T3 is 80 degrees Celsius [° C.], for example. The third temperature T4 is 100 degrees Celsius [° C.], for example.

Figure 15:
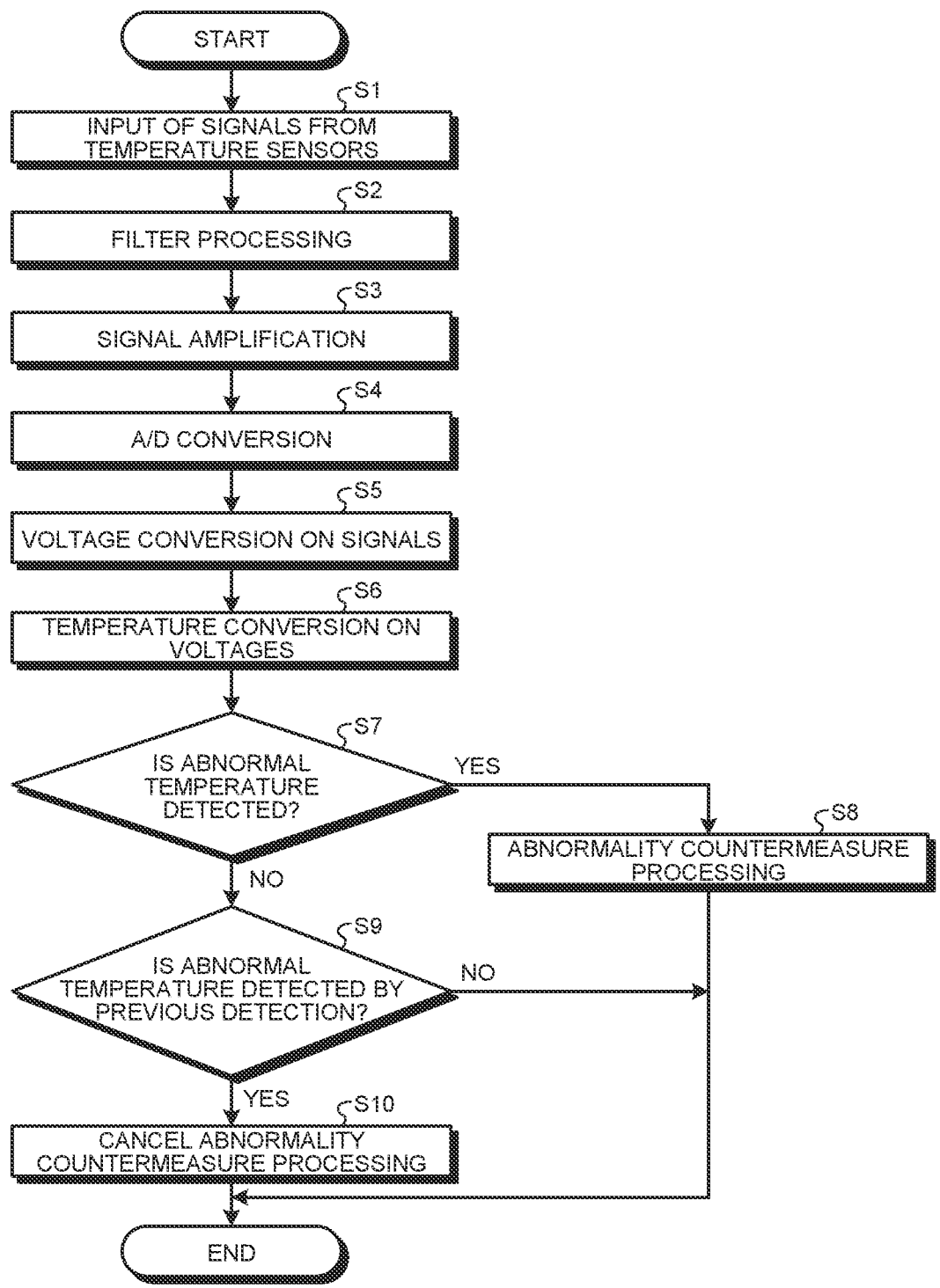
FIG. 15 is a flowchart illustrating exemplary temperature detection and processing based on the temperature detection.

FIG. 15 is a flowchart illustrating exemplary temperature detection and processing based on the temperature detection. The signals are input from the temperature sensors (step S1). Specifically, in the processing at step S1, the temperature detection controller 120 detects the resistances of the first temperature detection wiring SMX and the second temperature detection wiring SMY. In other words, the resistances of the first temperature detection wiring SMX and the second temperature detection wiring SMY are detected as the signals.

Filter processing is performed (step S2). Specifically, the temperature detection controller 120 has a filter circuit to remove noise components in analog electrical signals, which serve as the resistances, transmitted from the first temperature detection wiring SMX and the second temperature detection wiring SMY. In the processing at step S2, the filter circuit removes the noise from the electrical signals.

The signals are amplified (step S3). Specifically, the temperature detection controller 120 has an amplifier that amplifies the analog electrical signals, which serve as the resistances, transmitted from the first temperature detection wiring SMX and the second temperature detection wiring SMY. In the processing at step S3, the amplifier amplifies the electrical signals. The electrical signals are analog electrical signals from which noises have been removed by the processing at step S2.

A/D conversion is performed (step S4). Specifically, the temperature detection controller 120 has an A/D conversion circuit that converts the analog electrical signals, which serve as the resistances, transmitted from the first temperature detection wiring SMX and the second temperature detection wiring SMY into digital signals. In the processing at step S4, the A/D conversion circuit converts the analog electrical signals into the digital signals. The analog electrical signals are the electrical signals amplified by the processing at step S3. The processing from step S1 to step S4 is performed separately for each of the resistances of the first temperature detection wiring SMX and the second temperature detection wiring SMY.

Voltage conversion is performed on the signals (step S5). Specifically, the temperature detection controller 120 has a signal conversion circuit that identifies the voltage values represented by the digital signals obtained by the processing at step S4. In the processing at step S5, the signal conversion circuit converts the digital signals to the voltage values. As a result of the processing at step S5, the voltage values are identified that correspond to the resistances of the first temperature detection wiring SMX and the second temperature detection wiring SMY.

Temperature conversion is performed on the voltages (step S6). Specifically, the temperature detection controller 120 has a signal conversion circuit that identifies the temperature of the temperature detection region SM based on the combination of the voltage value of the first temperature detection wiring SMX and the voltage value of the second temperature detection wiring SMY that have been obtained by the processing at step S6. In the processing at step S6, the signal conversion circuit identifies the temperature from the voltage values. As a result of the processing at step S6, the temperature detection signal described above is generated.

For example, even when first voltage values become voltage values indicating relatively high temperatures due to light focused onto the light-focused region SP1, it is possible to identify that the temperatures of the partial regions other than the partial region (x6,y4) are lower than that of the partial region (x6,y4) because second voltage values are low. The first voltage valuess are voltage values of the first temperature detection wiring SMX and the second temperature detection wiring SMY corresponding to the temperature detection region (x6,y4). The second voltage values include voltage values of the first temperature detection wirings SMX other than the first temperature detection wiring SMX corresponding to coordinate x6 and voltage values of the second temperature detection wirings SMY other than the second temperature detection wiring SMY corresponding to coordinate y4.

The temperature detection controller 120 determines whether the abnormal temperature is detected (step S7). Specifically, the temperature detection controller 120 compares the temperature indicated by the temperature detection signal generated at step S6 with the threshold value (e.g., the threshold temperature T1) for determining whether the abnormal temperature is detected (refer to FIG. 14). In the embodiment, for example, when the temperature detection region SM is present in which a temperature equal to or higher than the threshold temperature T1 is detected, the temperature detection controller 120 determines that the abnormal temperature is detected. On the other hand, when the temperature detection region SM is absent in which a temperature equal to or higher the threshold temperature T1 is detected, the temperature detection controller 120 determines that no abnormal temperature is detected.

If it is determined by the processing at step S7 that the abnormal temperature is detected (Yes at step S7), the abnormality countermeasure processing is performed (step S8). The abnormality countermeasure processing is described later.

If it is determined by the processing at step S7 that no abnormal temperature is detected (No at step S7), the temperature detection controller 120 performs branch processing according to whether the abnormal temperature was detected in the previous detection (step S9). The processing described with reference to FIG. 15 is the processing that is performed multiple times over time. In other words, the "previous processing" indicates the processing that corresponds to the temperature detection and the processing based on the temperature detection as illustrated in FIG. 15, and was performed and completed immediately before the branch processing at step S9. If it is determined that the abnormal temperature is detected by the processing at step S7 (Yes at step S7) included in the processing performed and completed immediately before this processing, this processing at step S9 determines that the abnormal temperature has been detected in the previous detection (Yes at step S9). In this case, the abnormality countermeasure processing is canceled (step S10). On the other hand, if it is determined that no abnormal temperature is detected by the processing at step S7 (No at step S7) included in the processing performed and completed immediately before this processing, this processing at step S9 determines that no abnormal temperature is detected in the previous detection (No at step S9). In this case, the processing at step S10 is omitted.

Figure 16:
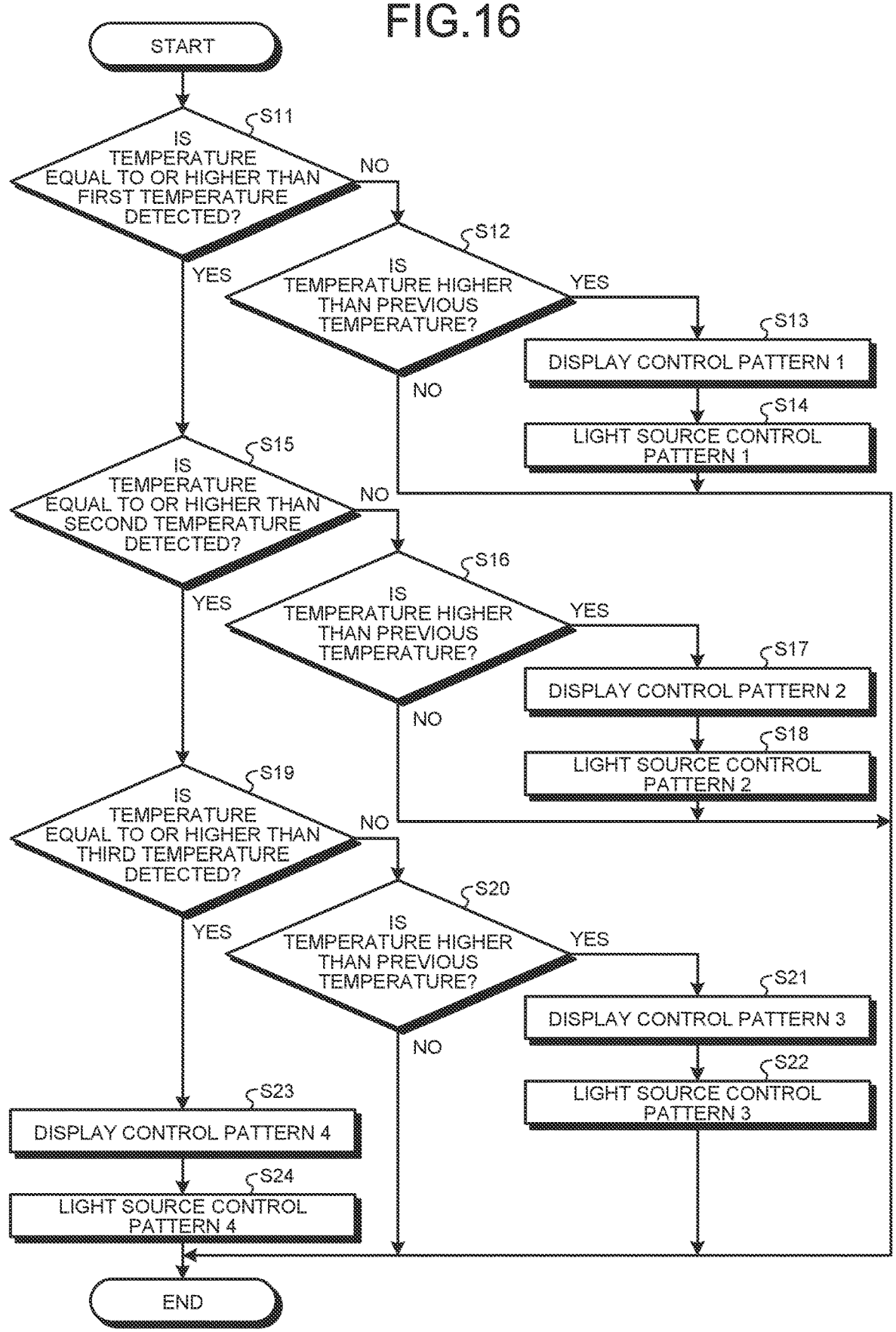
FIG. 16 is a flowchart illustrating exemplary abnormality countermeasure processing.

FIG. 16 is a flowchart illustrating exemplary abnormality countermeasure processing. The temperature detection controller 120 determines whether a partial region is present in which a temperature equal to or higher than the first temperature T2 is detected (step S11). If it is determined that a temperature equal to or higher than the first temperature T2 is not detected (No at step S11), the embodiment determines that a partial region is present in which a temperature equal to or higher than the threshold temperature T1 and lower than the first temperature T2 is detected. In this case, the temperature detection controller 120 determines whether the temperature exceeds the previous temperature (step S12). Specifically, by the processing at step S12, it is determined whether a temperature higher by α [° C.] than the temperature detected in the previous processing is detected in the partial region in which the temperature equal to or higher than the threshold temperature T1 and lower than the first temperature T2 is detected. Hereinafter, the "determination of whether the temperature exceeds the previous temperature" denotes the "determination of whether a temperature higher by α [° C.] than the temperature detected in the previous processing is detected" unless otherwise specified.

If it is determined by the processing at step S12 that the temperature exceeds the previous temperature (Yes step S12), the display controller 111 applies a display control pattern 1 (step S13) and the light source controller 112 applies a light source control pattern 1 (step S14). The processing at step S13 and the processing at step S14 are applied simultaneously. After the processing at step S13 and the processing at step S14, the abnormality countermeasure processing ends.

The display control pattern 1 causes a processing load of the display controller 111 to be smaller than that in a normal display control pattern. Specifically, the display control pattern 1 is frame image update control with a refresh rate of 30 [Hz], for example. The display control pattern 1 is not limited to this example, and can be modified as appropriate within the definition.

The normal display control pattern is the display control pattern of the display region AA applied by the display controller 111 when the partial region is absent in which a temperature equal to or higher than the threshold temperature T1 is detected. Specifically, the normal display control pattern is the frame image update control with a refresh rate of 60 [Hz] or 120 [Hz], for example. The normal display control pattern is not limited to this example, and can be modified as appropriate.

The light source control pattern 1 is an operation control pattern that causes the light source device 6 to generate less heat than that in a normal light source control pattern. Specifically, the light source control pattern 1 is a light source control pattern that causes the light sources 61 to blink at a predetermined cycle during a lighting period (e.g., periods T13, T23) described later, for example. The light source control pattern 1 is not limited to this example, and can be modified as appropriate within the definition.

The normal light source control pattern is the operation control pattern of the light source device 6 applied by the light source controller 112 when the partial region is absent in which a temperature equal to or higher than the threshold temperature T1 is detected. Specifically, the normal light source control pattern is constant lighting of the light sources 61 during the lighting period, for example. The normal light source control pattern is not limited to this example, and can be modified as appropriate.

On the other hand, if it is determined by the processing at step S12 that the temperature does not exceed the previous temperature (No at step S12), the abnormality countermeasure processing ends. In other words, if it is determined that the temperature is equal to or higher than the threshold temperature T1 and lower than the first temperature T2, and the temperature does not exceed the previous temperature, the normal display control pattern and the normal light source control pattern are applied.

In the embodiment, a is set to a value smaller than the minimum value of the differences in temperature among the threshold temperature T1, the first temperature T2, the second temperature T3, and the third temperature T4. Specifically, for example, $\alpha=5$, but it is not limited to this example, and the specific value of a can be modified as appropriate.

If it is determined by the processing at step S11 that a temperature equal to or higher than the first temperature T2 is detected (Yes at step S11), the temperature detection controller 120 determines whether the partial region is present in which a temperature equal to or higher than the second temperature T3 is detected (step S15). If it is determined that a temperature equal to or higher than the second temperature T3 is not detected (No at step S15), the embodiment determines that the partial region is present in which a temperature equal to or higher than the first temperature T2 and lower than the second temperature T3 is detected. In this case, the temperature detection controller 120 determines whether the temperature exceeds the previous temperature in the partial region in which the temperature equal to or higher than the first temperature T2 and lower than the second temperature T3 is detected (step S16).

If it is determined by the processing at step S16 that the temperature exceeds the previous temperature (Yes step S16), the display controller 111 applies a display control pattern 2 (step S17) and the light source controller 112 applies a light source control pattern 2 (step S18). The processing at step S17 and the processing at step S18 are applied simultaneously. After the processing at step S17 and the processing at step S18, the abnormality countermeasure processing ends.

The display control pattern 2 causes the processing load of the display controller 111 to be smaller than that in the display control pattern 1. Specifically, the refresh rate in the display control pattern 2 is smaller than that in the display control pattern 1. The display control pattern 2 is the frame image update control with a refresh rate of 10 [Hz], for example. The display control pattern 2 is not limited to this example, and can be modified as appropriate within the definition.

The light source control pattern 2 is the operation control pattern that causes the light source device 6 to generate less heat that in the light source control pattern 1. Specifically, the light source control pattern 2 is the light source control pattern that causes the light sources 61 to perform the blink operation in the same manner as the light source control pattern 1, for example. However, when the ratio of a lighting-on time to a lighting-off time of the light sources 61 in the blinking is compared between the light source control patterns 1 and 2, the lighting-on time in the light source control pattern 2 is shorter than that in the light source control pattern 1 while the lighting-off time in the light source control pattern 2 is longer than that in the light source control pattern 1. The light source control pattern 2 is not limited to this example and can be modified as appropriate within the definition.

On the other hand, if it is determined by the processing at step S16 that the temperature does not exceed the previous temperature (No at step S16), the abnormality countermeasure processing ends. In other words, in this case, the display control pattern and the light source control pattern applied in the previous abnormality countermeasure processing are maintained.

If it is determined by the processing at step S15 that a temperature equal to or higher than the second temperature T3 is detected (Yes at step S15), the temperature detection controller 120 determines whether a partial region is present in which a temperature equal to or higher than the third temperature T4 is detected (step S19). If it is determined that a temperature equal to or higher than the third temperature T4 is not detected (No at step S19), the embodiment determines that the partial region is present in which a temperature equal to or higher than the second temperature T3 and lower than the third temperature T4 is detected. In this case, the temperature detection controller 120 determines whether the temperature exceeds the previous temperature in the partial region in which the temperature equal to or higher than the second temperature T3 and lower than the third temperature T4 is detected (step S20).

If it is determined by the processing that the temperature exceeds the previous temperature at step S20 (Yes step S20), the display controller 111 applies a display control pattern 3 (step S21) and the light source controller 112 applies a light source control pattern 3 (step S22). The processing at step S21 and the processing at step S22 are applied simultaneously. After the processing at step S21 and the processing at step S22, the abnormality countermeasure processing ends.

The display control pattern 3 causes the processing load of the display controller 111 to be smaller than that in the display control pattern 2. Specifically, the display control pattern 3 resets the display output in the display region AA and stops updating the frame image after the reset, for example. The display control pattern 3 is not limited to this example, and can be modified as appropriate within the definition. For example, the refresh rate in the display control pattern 3 may be smaller than that in the display control pattern 2.

The light source control pattern 3 is the operation control pattern that causes the light source device 6 to generate less heat that in the light source control pattern 2. Specifically, the light source control pattern 3 turns off the light sources 61, for example. The light source control pattern 3 is not limited to this example, and can be modified as appropriate within the definition. For example, when the light sources 61 perform the blink operation and the ratio of the lighting-on time to the lighting-off time of the light sources 61 in the blinking is compared between the light source patterns 2 and 3, the lighting-on time in the light source control pattern 3 may be shorter than that in the light source control pattern 2 while the lighting-off time in the light source control pattern 3 may be longer than that in the light source control pattern 3.

On the other hand, if it is determined by the processing at step S20 that the temperature does not exceed the previous temperature (No at step S20), the abnormality countermeasure processing ends. In other words, in this case, the display control pattern and the light source control pattern applied in the previous abnormality countermeasure processing are maintained.

If it is determined by the processing at step S19 that a temperature equal to or higher than the third temperature T4 is detected (Yes at step S19), the display controller 111 applies a display control pattern 4 (step S23) and the light source controller 112 applies a light source control pattern 4 (step S24). The processing at step S23 and the processing at step S24 are applied simultaneously. After the processing at step S23 and the processing at step S24, the abnormality countermeasure processing ends.

The display control pattern 4 can reduce the processing load of the display controller 111 to an equal extent to that in the display control pattern 3 or to a greater extent than that. The light source control pattern 4 can reduce heat generation from the light source device 6 to an equal extent to that in the light source control pattern 3 or to a greater extent than that. Specifically, the display control pattern 4 resets the display output in the display region AA and stops updating the frame image after the reset in the same manner as the display control pattern 3, for example. The light source control pattern 4 turns off the light sources 61 in the same manner as the light source control pattern 3, for example. The display control pattern 4 and the light source control pattern 4 are not limited to these patterns, and can be modified as appropriate within the definition. For example, the display output may continue in the display control pattern 3 and the light source control pattern 3, and the display output may be stopped in the display control pattern 4 and the light source control pattern 4.

As described above, in the abnormality countermeasure processing, the display control and the light source control are performed corresponding to the partial region in which the highest temperature is detected in the partial regions included in the display region AA, for example. When the temperature reaches at least the third temperature T4, the display control pattern different from the normal display control pattern, and the light source control pattern different from the normal light source control pattern are applied without fail.

Note that a may be set as close to zero as possible. In other words, the determinations at step S12, step S16, and step S20 may be set to Yes when the temperature rises more than the previous processing. In this case, the display control patterns and the light source control patterns are applied that correspond to the following temperature ranges: equal to or higher than the threshold temperature T1 and lower than the first temperature T2, equal to or higher than the first temperature T2 and lower than the second temperature T3, equal to or higher than the second temperature T3 and lower than the third temperature T4, and equal to or higher than the third temperature T4.

The specific content of the abnormality countermeasure processing is not limited to this example. The specific content of the abnormality countermeasure processing may be based on the number of partial regions in each of which a temperature equal to or higher than the threshold temperature T1 is detected. The following describes exemplary abnormality countermeasure processing based on the number of partial regions in each of which a temperature equal to or higher than the threshold temperature T1 is detected with reference to the flowcharts in FIGS. 17 and 18.

Figure 17:
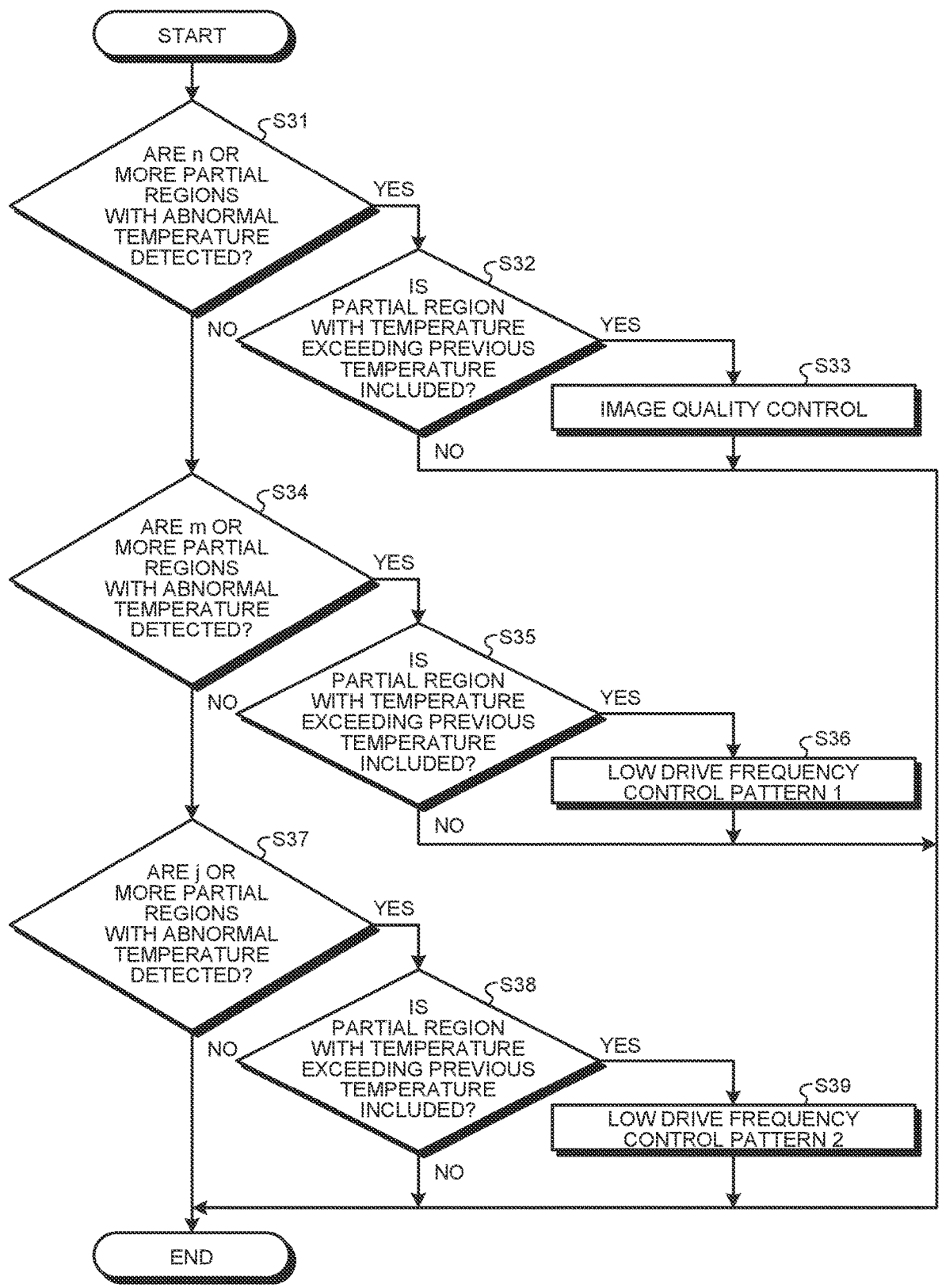
FIG. 17 is a flowchart illustrating an exemplary branch process of the abnormality countermeasure processing related to display control based on the number of partial regions in each of which an abnormal temperature is detected.

FIG. 17 is a flowchart illustrating an exemplary branch process of the abnormality countermeasure processing related to the display control based on the number of partial regions in each of which the abnormal temperature is detected.

The temperature detection controller 120 determines whether the number of partial regions in each of which the abnormal temperature is detected is equal to or larger than n (step S31). Note that n and, m and j, which are described later, are natural numbers. Also, n>m>j. If it is determined that the number of partial regions in each of which the abnormal temperature is detected is equal to or larger than n (Yes at step S31), the temperature detection controller 120 determines whether the temperature exceeds the previous temperature (step S32). If it is determined by the processing at step S32 that the temperature exceeds the previous temperature (Yes at step S32), the display controller 111 applies image quality control (step S33). When the image quality control is applied, the display output is performed at a lower gradation number (e.g., 8 bits) than a normal gradation number (e.g., 24 bits) that is applied when no abnormality countermeasure processing is performed. This reduces the processing load on the display controller 111 and heat generated from the display controller 111. If it is determined by the processing at step S32 that the temperature does not exceed the previous temperature (No at step S32) or after the processing at step S33, the abnormality countermeasure processing ends.

If it is determined by the processing at step S31 that the number of partial regions in each of which the abnormal temperature is detected is smaller than n (No at step S31), the temperature detection controller 120 determines whether the number of partial regions in each of which the abnormal temperature is detected is equal to or larger than m (step S34). If it is determined that the number of partial regions in each of which the abnormal temperature is detected is equal to or larger than m (Yes at step S34), the temperature detection controller 120 determines whether the temperature exceeds the previous temperature (step S35). If it is determined by the processing at step S35 that the temperature exceeds the previous temperature (Yes at step S35), the display controller 111 applies a low drive frequency control pattern 1 (step S36). When the low drive frequency control pattern 1 is applied, a refresh rate (e.g., 10 [Hz]) is applied that is lower than the normal refresh rate (e.g., 60 [Hz] or 120 [Hz]) that is applied when no abnormality countermeasure processing is performed. The refresh rate value is not limited to these values and can be modified as appropriate. This reduces the processing load on the display controller 111 and heat generated from the display controller 111. If it is determined by the processing at step S35 that the temperature does not exceed the previous temperature (No at step S35) or after the processing at step S36, the abnormality countermeasure processing ends.

If it is determined by the processing at step S34 that the number of partial regions in each of which the abnormal temperature is detected is smaller than m (No at step S34), the temperature detection controller 120 determines whether the number of partial regions in each of which the abnormal temperature is detected is equal to or larger than j (step S37). If it is determined that the number of partial regions in each of which the abnormal temperature is detected is equal to or larger than j (Yes at step S37), the temperature detection controller 120 determines whether the temperature exceeds the previous temperature (step S38). If it is determined by the processing at step S35 that the temperature exceeds the previous temperature (Yes at step S38), the display controller 111 applies a low drive frequency control pattern 2 (step S39). When the low drive frequency control pattern 2 is applied, a refresh rate (e.g., 30 [Hz]) is applied that is lower than the normal refresh rate that is applied when no abnormality countermeasure processing is performed, but higher than the refresh rate in the low drive frequency control pattern 1. The refresh rate value is not limited to this value and can be modified as appropriate. This reduces the processing load on the display controller 111 and heat generated from the display controller 111. If it is determined by the processing at step S37 that the number of partial regions in each of which the abnormal temperature is detected is smaller than j (No at step S37), if it is determined by the processing at step S38 that the temperature does not exceed the previous temperature (No at step S38), or after the processing at step S39, the abnormal countermeasure processing ends.

The application area of the refresh rate by the processing at step S36 or step S39 may be the entire display region AA, or it may be limited to a specific partial region. The specific partial region denotes a plurality of partial regions that share the scan line GCL disposed corresponding to the partial region corresponding to the temperature detection region SM in which the abnormal temperature is detected. When the application area of the refresh rate is the specific partial region, the partial regions other than the specific partial region are rewritten with the pixel signals according to updating of the frame image. However, for the specific partial region, a period of time occurs in which the pixel signals are not rewritten (application of the drive signal to the scan line GCL is omitted).

The abnormality countermeasure processing related to the display control based on the number of partial regions in each of which the abnormal temperature is detected is not limited to the processing described above. For example, as the abnormality countermeasure processing, processing may be applied that omits part or all of the gradation correction processing, such as adjusting the contrast and brightness of an image by increasing the luminance of part or all of the frame image.

Figure 18:
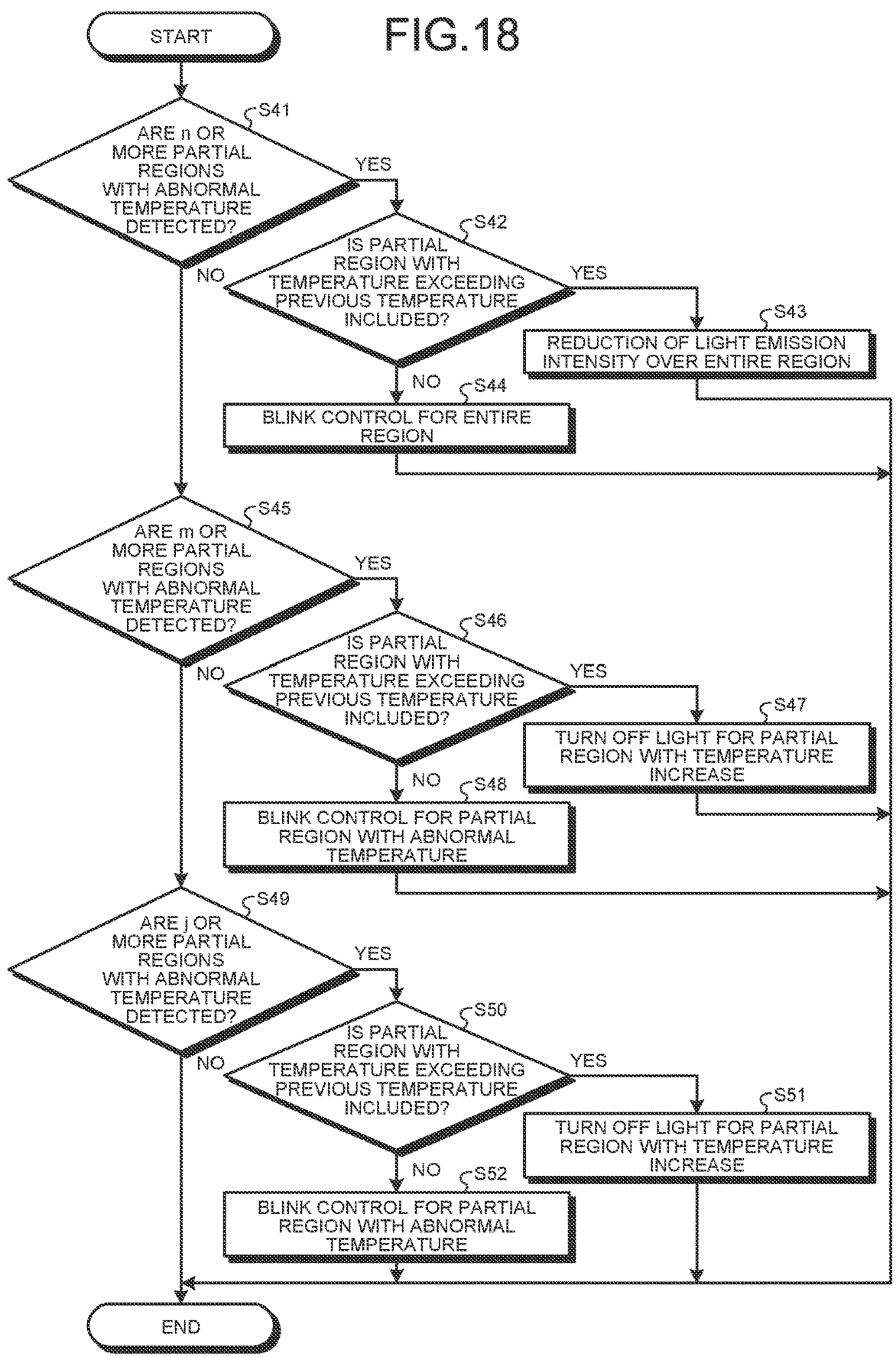
FIG. 18 is a flowchart illustrating an exemplary branch process of the abnormality countermeasure processing related to light source control based on the number of partial regions in each of which the abnormal temperature is detected.

FIG. 18 is a flowchart illustrating an exemplary branch process of the abnormality countermeasure processing related to the light source control based on the number of partial regions in each of which the abnormal temperature is detected.

The temperature detection controller 120 determines whether the number of partial regions in each of which the abnormal temperature is detected is equal to or larger than n (step S41). If it is determined that the number of partial regions in each of which the abnormal temperature is detected is equal to or larger than n (Yes at step S41), the temperature detection controller 120 determines whether the temperature exceeds the previous temperature (step S42). If it is determined by the processing at step S42 that the temperature exceeds the previous temperature (Yes at step S42), the light source controller 112 applies a reduction in light emission intensity over the entire light emission region by the light source device 6 (step S43). The reduction in light emission intensity over the entire light emission intensity denotes the reduction in light emission intensity of each light source 61 by reducing the current flowing in the light source 61 to be smaller than that in the normal state in which no abnormality countermeasure processing is performed.

If it is determined by the processing at step S42 that the temperature does not exceed the previous temperature (No at step S42), the light source controller 112 applies the blink control to the entire light emission region by the light source device 6 (step S44). The blink control of the entire light emission region is the control that causes the light sources 61 included in the light source device 6 to perform what is called a blink operation, in which the light sources 61 blink at a predetermined period during the lighting period (e.g., periods T13 and T23) described later, for example. The blink control is the same mechanism as the light source control pattern 1 or the light source control pattern 2.

The relation between the lighting-on time and the lighting-off time of the light source device 6 that blinks by the blink control may be the same as or different from that in the light source control pattern 1 or the light source control pattern 2. The processing at step S43 or step S44 reduces the heat generated due to the light sources 61. The degree of reduction of the light emission intensity of each light source 61 by the processing at step S43 is desirably set such that the heat generated by the light sources 61 is more reduced than that by the blinking of each light source 61 by the processing at step S44.

After the processing at step S43 or step S44, the abnormality countermeasure processing ends.

If it is determined by the processing at step S41 that the number of partial regions in each of which the abnormal temperature is detected is smaller than n (No at step S41), the temperature detection controller 120 determines whether the number of partial regions in each of which the abnormal temperature is detected is equal to or larger than m (step S45). If it is determined that the number of partial regions in each of which the abnormal temperature is detected is equal to or larger than m (Yes at step S45), the temperature detection controller 120 determines whether the temperature exceeds the previous temperature (step S46). If it is determined by the processing at step S46 that the temperature exceeds the previous temperature (Yes at step S46), the light source controller 112 turns off the light sources 61 arranged on the rear side of the partial region corresponding to the temperature rise area determined to have the temperature exceeding the previous temperature (step S47). On the other hand, if it is determined by the processing at step S46 that the temperature does not exceed the previous temperature (No at step S46), the light source controller 112 applies the blink control to the light sources 61 arranged corresponding to the partial region in which the abnormal temperature is detected (step S48). After the processing at step S47 or step S48, the abnormality countermeasure processing ends.

If it is determined by the processing at step S45 that the number of partial regions in each of which the abnormal temperature is detected is smaller than m (No at step S45), the temperature detection controller 120 determines whether the number of partial regions in each of which the abnormal temperature is detected is equal to or larger than j (step S49). If it is determined that the number of partial regions in each of which the abnormal temperature is detected is equal to or larger than j (Yes at step S49), the temperature detection controller 120 determines whether the temperature exceeds the previous temperature (step S50). If it is determined by the processing at step S50 that the temperature exceeds the previous temperature (Yes at step S50), the light source controller 112 turns off the light sources 61 arranged on the rear side of the partial region corresponding to the temperature rise area determined to have the temperature exceeding the previous temperature (step S51). On the other hand, if it is determined by the processing at step S50 that the temperature does not exceed the previous temperature (No at step S50), the light source controller 112 applies the blink control to the light sources 61 arranged corresponding to the partial region in which the abnormal temperature is detected (step S52). In this case, the blink control may be performed such that the light emission time per unit time is shorter than that in the blink control at step S48. After the processing at step S43, after the processing at step S44, or when it is determined by the processing at step S49 that the number of partial regions in each of which the abnormal temperature is detected is smaller than j (No at step S49), the abnormality countermeasure processing ends.

The abnormality countermeasure processing related to the light source control based on the number of partial regions in each of which the abnormal temperature is detected is not limited to the processing described above. For example, when multiple light sources 61 are arranged in each partial region, processing for reducing the number of light sources 61 to be turned on in each partial region may be applied as the abnormality countermeasure processing. This can further reduce the amount of heat generated in the whole of the light source device 6 and the amount of heat generated by the light sources 61 in the vicinity of the partial region in which the abnormal temperature is detected.

The values of n, m, and j are as follows: n=20, m=5, and j=1, for example. The values are not limited to these values and can be modified as appropriate within the range satisfying n>m>j. Instead of the determination of the number of partial regions by using natural numbers such as n, m, and j, the determination may be made based on the ratio of the number of partial regions in each of which the abnormal temperature is detected with respect to the total number of partial regions included in the display region AA. For example, the determination at step S31 and step S41 may be replaced with the determination "whether the percentage of the partial region in which the abnormal temperature is detected is equal to or larger than 80%".

The HUD device 1 may be designed in a manner such that the temperature detection function and the function of the abnormality countermeasure processing based on temperature detection can be turned on and off. The ON/OFF control is performed based on input of a setting signal from the control device 110, for example.

Figures 19, 20:
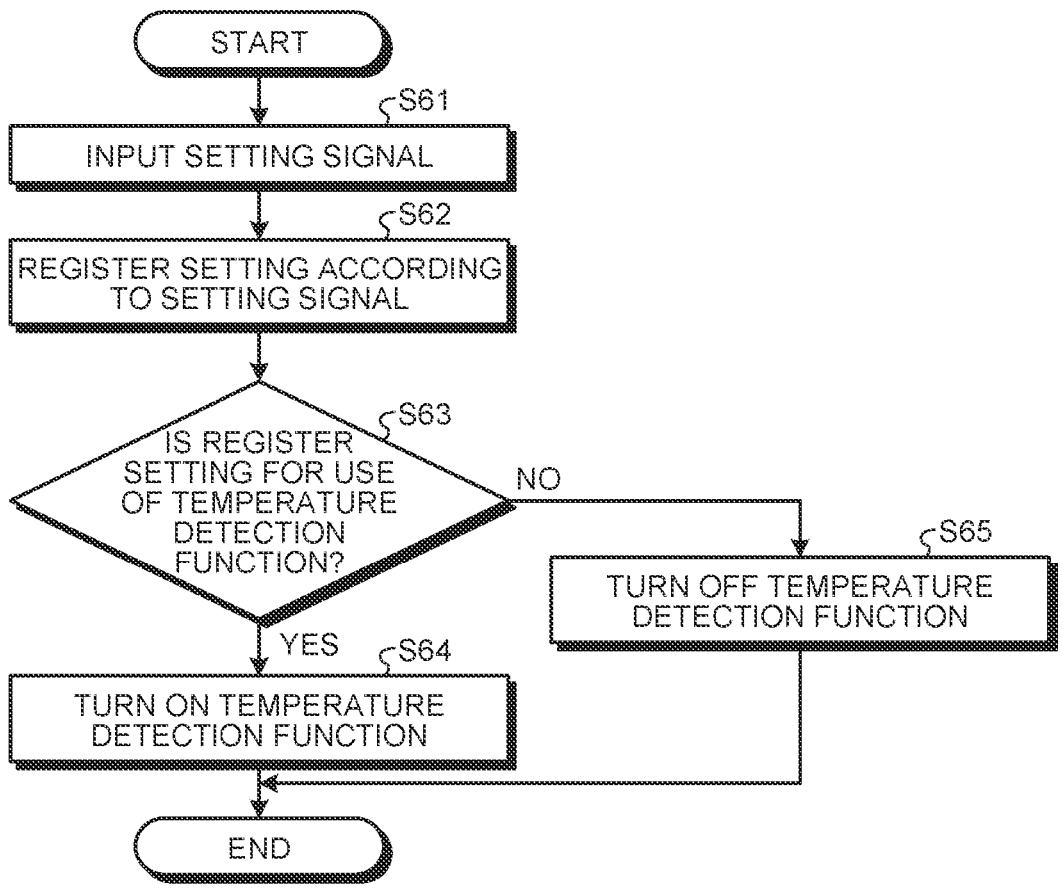
FIG. 19 is a flowchart illustrating exemplary processing related to ON/OFF control of temperature detection function.
FIG. 20 is a table illustrating an exemplary relation between a detection region, a detection timing, and a detection frequency.

FIG. 19 is a flowchart illustrating exemplary processing of the ON/OFF control of the temperature detection function. The setting signal is input (step S61). The DDIC 19 performs register setting in accordance with the setting signal (step S62). Specifically, the CPU of the processor 117 acquires the setting signal and sets, in the register, information corresponding to the various types of setting information included in the setting signal, for example. Such setting information includes information indicating whether the temperature detection function is used. Hereinafter, when simply referring to "setting information", it refers to the setting information that is included in the setting signal and reflected in the register setting.

If the register setting by the processing at step S62 indicates the use of the temperature detection function (Yes at step S63), the temperature detection controller 120 turns on the temperature detection function (step S64). In other words, the various types of processing related to the temperature detection described above with reference to FIGS. 12 to 19 are set to be performed. On the other hand, if the register setting by the processing at step S62 does not indicate the use of the temperature detection function (No at step S63), the temperature detection controller 120 turns off the temperature detection function (step S65). In other words, the various types of processing related to the temperature detection described above with reference to FIGS. 12 to 19 are set not to be performed.

The setting information may include timer information that manages the time related to the operation of the HUD device 1 (e.g., continuous operation time and the like). In such a case, the timer information is reflected in the operation of a timer circuit of the HUD device 1 (not illustrated) and in various operations that operate according to the time recorded by the timer circuit. The timer circuit may be integrated in some circuit, such as the processor 117 of the DDIC 19, or it may be provided independently.

Furthermore, the setting information may include information about the relation between a temperature detection target, a temperature detection timing, and a temperature detection frequency when the temperature detection function is used.

FIG. 20 is a table illustrating an exemplary relation between the detection region, the detection timing, and the detection frequency. As illustrated in FIG. 20, "single area", "multiple areas", and "all areas" are provided as types of the detection region. The "single area" refers to a case where the temperature detection is performed on one of the temperature detection regions SM. The "multiple areas" refers to a case where the temperature detection is performed on two or more, but not all, of the temperature detection regions SM. The "all areas" refers to a case where the temperature detection is performed on all of the temperature detection regions SM.

As illustrated in FIG. 20, "blanking and write" or "blanking" is provided as the type of the detection timing. The "blanking and write" indicates that the temperature detection is performed during a blanking period (e.g., periods T11 and T21) and a write period (e.g., periods T12 and T22), which are described later. The "blanking" indicates that the temperature detection is performed during the blanking period, which is described later.

As illustrated in FIG. 20, "1 to 120 Hz", "1 to 60 Hz", and "1 to 10 Hz" are provided as the types of the detection frequency. The "1 to 120 Hz" indicates that the temperature detection is performed within a range of 1 to 120 times per second. The "1 to 60 Hz" indicates that the temperature detection is performed within a range of 1 to 60 times per second. The "1 to 10 Hz" indicates that the temperature detection is performed within a range of 1 to 10 times per second.

In other words, in the example illustrated in FIG. 20, the temperature detection targeting the "single area" is set to be performed within a range of 1 to 120 times per second, using the blanking period and the write period. The temperature detection targeting the "multiple areas" is set to be performed within a range of 1 to 60 times per second using the blanking period. The temperature detection targeting the "all areas" is set to be performed within a range of 1 to 10 times per second, using the blanking period.

The temperature detection controller 120 performs control in a manner such that the temperature detection frequency in the partial region in which the abnormal temperature is detected is higher than that in other partial regions, in accordance with the setting in the register corresponding to the information as exemplified in FIG. 20. To take a specific example, when no abnormal temperature is detected in all of the partial regions, the temperature detection controller 120 performs the temperature detection targeting the "all areas" 10 times per second using the blanking period, for example. When the abnormal temperature is detected in one of the partial regions, the temperature detection controller 120 then performs the temperature detection targeting the "all areas" 10 times per second using the blanking period, and also performs the temperature detection targeting the partial region in which the abnormal temperature is detected as the "single area" 120 times per second using the blanking period and the write period. Here, the "all areas" includes the "single area". The temperature detection limited to the "single area" is performed 110 times per second, and the temperature detection targeting the "all areas" including the "single area" is performed 10 times per second. When the abnormal temperature is detected in multiple partial regions that are not all of the partial regions, the temperature detection controller 120 then performs the temperature detection targeting the "all areas" 10 times per second using the blanking period, and also performs the temperature detection on the multiple partial regions in which the abnormal temperature is detected as the "multiple areas" 60 times per second using the blanking period and the write period. Here, the "all areas" includes the "multiple areas". Thus, the temperature detection limited to the "multiple areas" is performed 50 times per second, and the temperature detection targeting the "all areas" including the "single area" is performed 10 times per second.

As described above, the temperature detection controller 120 further increases the temperature detection frequency in the partial regions in which the abnormal temperature is detected. As a result, the display control by the control device 110 and the light source control by the light source controller 112 corresponding to the temperature can be performed more quickly on the partial regions on which more strict temperature control is required.

In the embodiment, the detection frequency of the "single area" is set to be equal to or higher than those of the "multiple areas" and the "all areas", and the detection frequency of the "multiple areas" is set to be equal to or higher than that of the "all areas". The detection frequencies are not limited to those examples. The order of the detection frequencies may be reversed.

The following describes the more specific detection timing, detection frequency, and detection target related to the temperature detection with reference to FIGS. 21 to 25.

Figure 21:
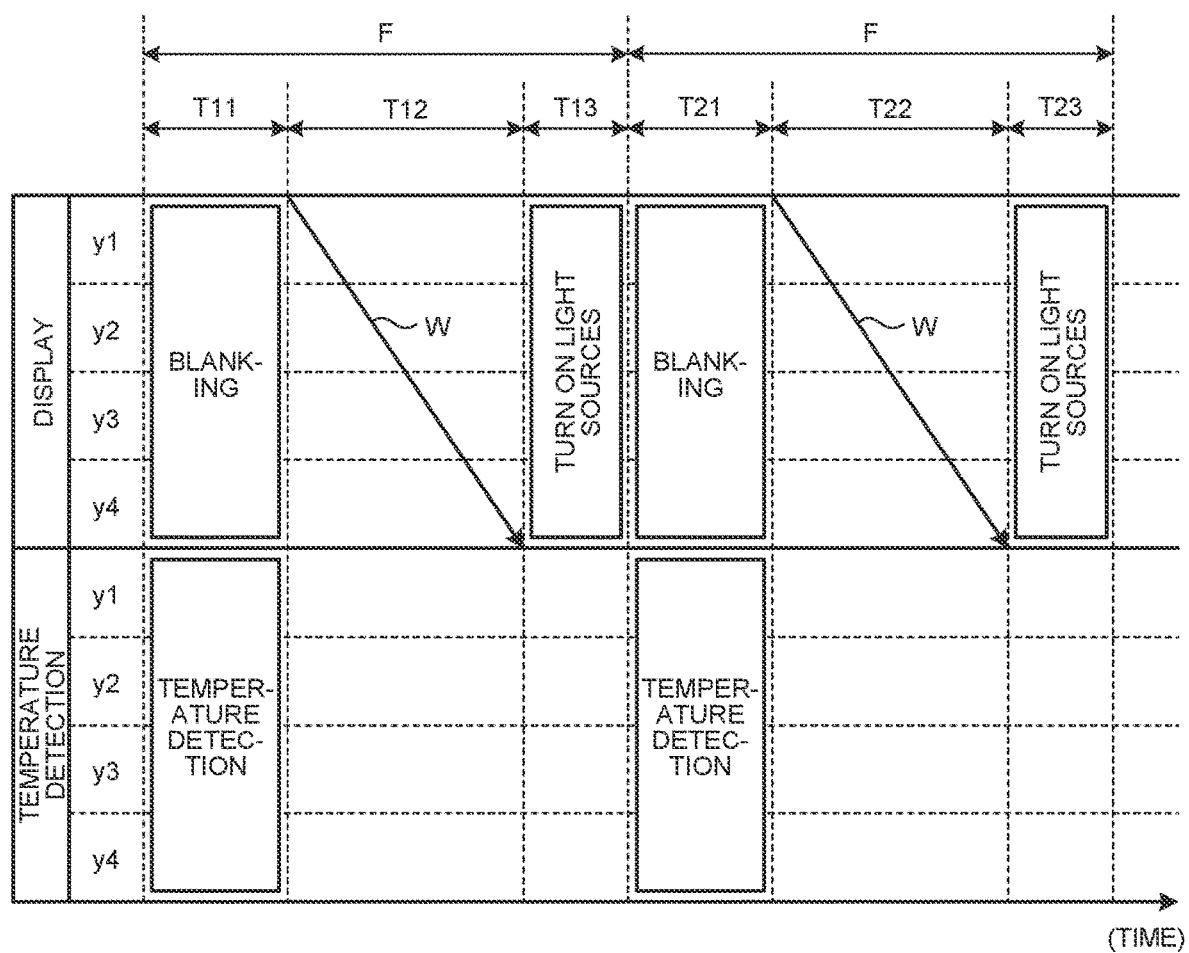
FIG. 21 is a time chart illustrating an exemplary relation between a blanking period, a write period, and a lighting period that are included in a frame period, and a temperature detection timing.

FIG. 21 is a time chart illustrating an exemplary relation between periods T11, T21, T12, T22, T13, and T23 included in the frame periods F and the temperature detection timing. FIGS. 21 to 25 exemplifies the frame periods F of two consecutive frames. The frame period F is the period during which various types of processing related to the display of a single frame image are performed. In FIGS. 21 to 25, the "display" row illustrates the details of processing related to the display, and the "temperature detection" row illustrates the details of processing related to the temperature detection.

The following describes the details of various processing related to the display in the frame period F. What is described here is the normal processing performed when no abnormality countermeasure processing is performed. In periods T11 and T21, each pixel VPix is reset. In periods T12 and T22, pixel signals corresponding to the frame image are each written to the corresponding pixel VPix after reset. The arrows W in periods T12 and T22 schematically illustrate the scan progression associated with the writing of the pixel signals. During the blanking and the write periods, the light sources 61 are off. During periods T13 and T23, the light sources 61 are on, and light corresponding to the frame image is projected.

Figure 22:
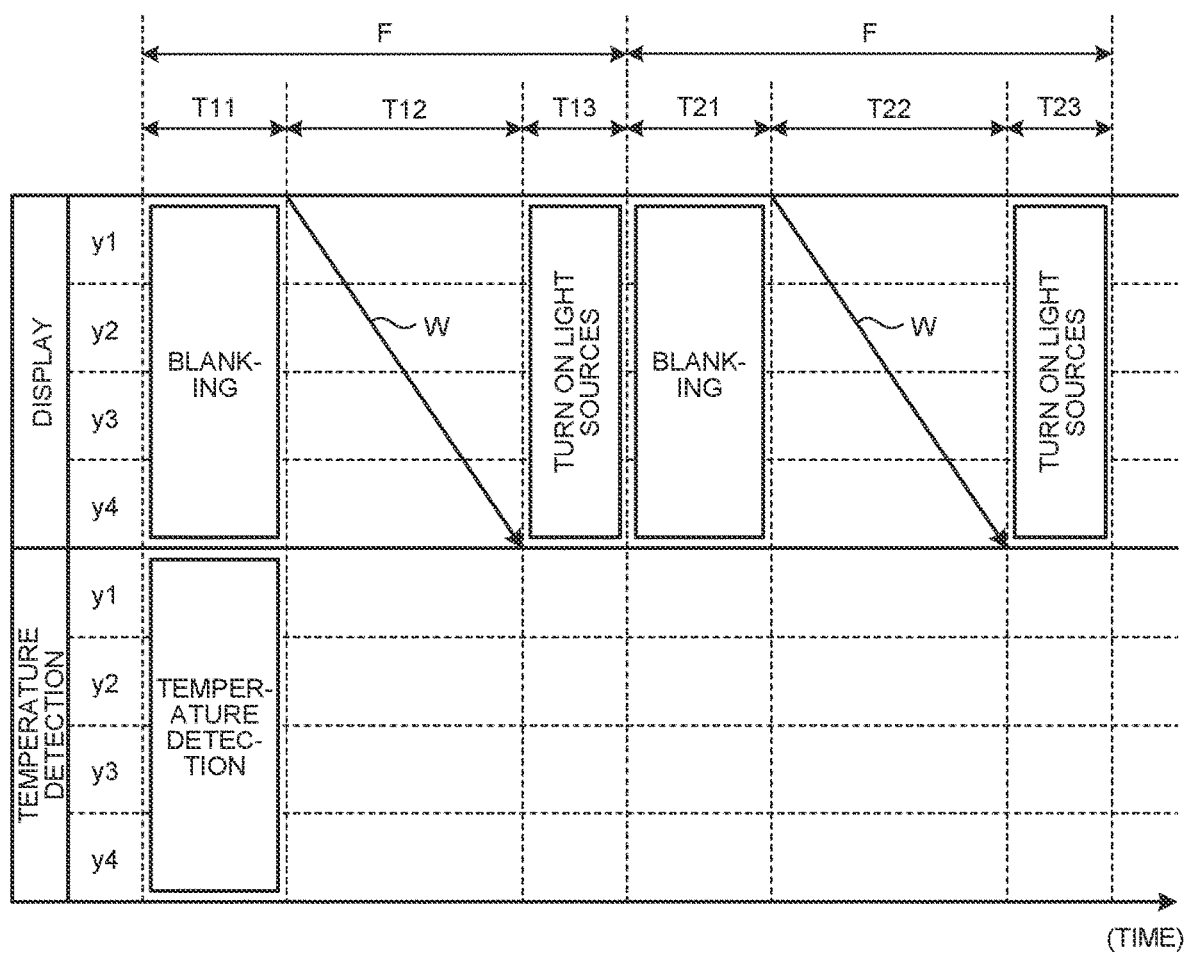
FIG. 22 is a time chart illustrating another exemplary relation between the blanking period, the write period, and the lighting period that are included in the frame period, and the temperature detection timing.

FIG. 21 exemplifies a case where the temperature detection is performed at the timing and frequency synchronized with the periods T11 and T21 of every frame. The example of the temperature detection illustrated in FIG. 21 is a case where the temperature detection targeting the "multiple areas" is performed 60 times per second using the blanking period when the frame rate of the display output is 60 [Hz], for example. In FIGS. 21 and 22, the rectangle "temperature detection" illustrated in the area from coordinate y1 to coordinate y4 indicates that the temperature detection is performed on the "multiple areas" (or "all areas").

FIG. 22 is a time chart illustrating another exemplary relation between the blanking period, the write period, the lighting period that are included in the frame period, and the temperature detection timing. FIG. 22 exemplifies a case where the temperature detection is performed in period T11 and no temperature detection is performed in period T21. The temperature detection may be performed once per three or more frame periods F, which is not illustrated, instead of once per two frame periods F. In other words, the temperature detection frequency may be lower than the frame rate. An example of the temperature detection illustrated in FIG. 22 is the temperature detection that is performed on the "all areas" 10 times per second using the blanking period when the frame rate of the display output is 60 [Hz].

Figure 23:
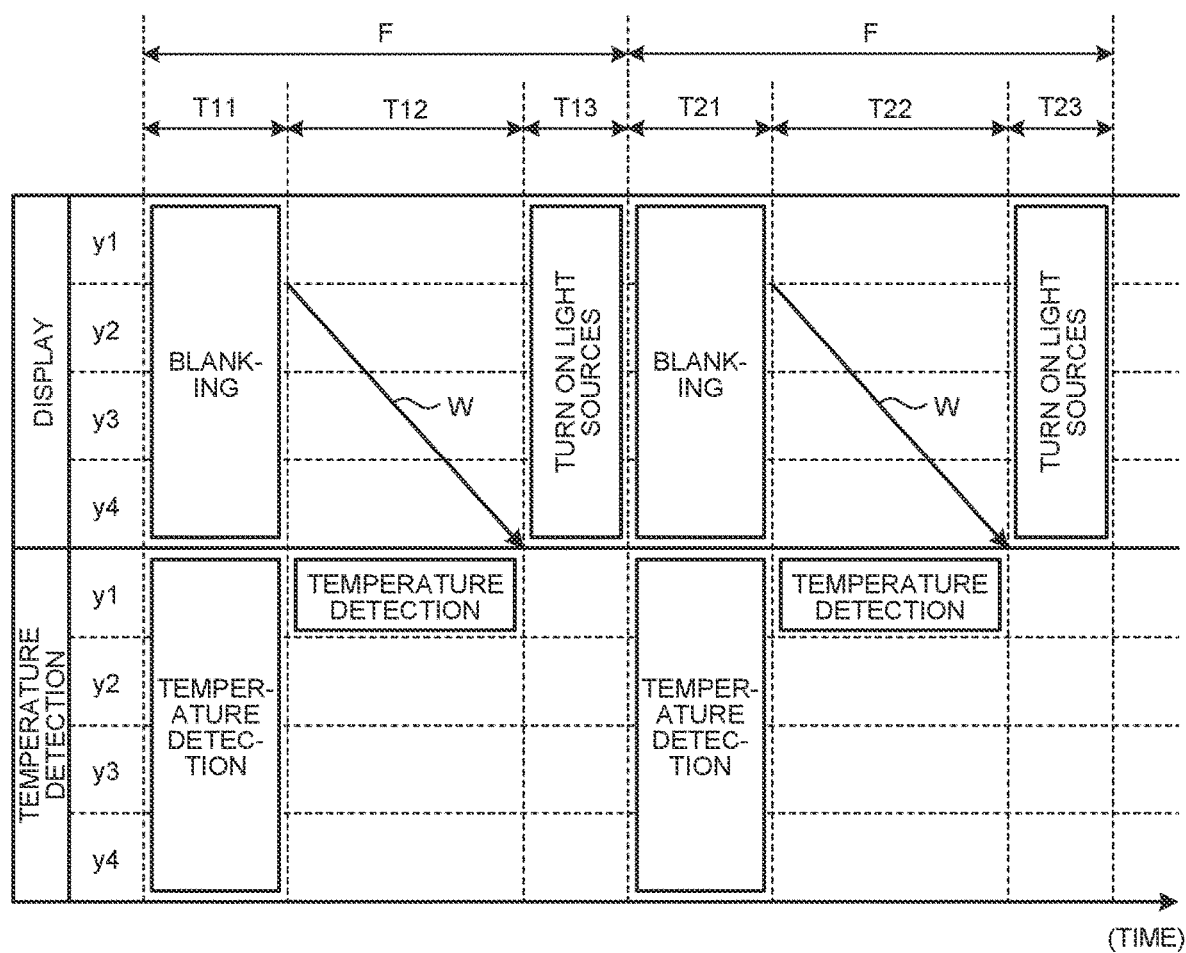
FIG. 23 is a time chart illustrating still another exemplary relation between the blanking period, the write period, and the lighting period that are included in the frame period, and the temperature detection timing.

FIG. 23 is a time chart illustrating still another exemplary relation between the blanking period, the write period, and the lighting period that are included in the frame period, and the temperature detection timing. FIG. 23 exemplifies a case where the temperature detection is performed on the "multiple areas" (or "all areas") in periods T11 and T21 of every frame, and the temperature detection is performed on the partial region with coordinate y1 in periods T12 and T22. In other words, the temperature detection frequency may be equal to or higher than the frame rate. An example of the temperature detection illustrated in FIG. 23 is the temperature detection that is performed on the "single area" 120 times per second using the blanking period and the write period when the frame rate of the display output is 60 [Hz]. In FIG. 23 and other figures, the rectangle "temperature detection" illustrated at coordinate y1 in periods T12 and T22 indicates that the temperature detection is further performed on the "single area" with coordinate y1. The "single area" with coordinate y1 is also included in the temperature detection timing of the "multiple areas" (or "all areas") indicated by the rectangle "temperature detection" illustrated in the area from coordinate y1 to coordinate y4. As a result, the temperature detection frequency of the partial region corresponding to the "single area" with coordinate y1 is higher than that in other partial regions. An example of the temperature detection illustrated in FIG. 22 is the temperature detection that is performed on the "single area" 120 times per second using the blanking period and the write period when the frame rate of the display output is 60 [Hz].

The expression "FIG. 23 and other figures" indicates FIG. 23 and FIGS. 24 and 25, which are described later. FIG. 23 and other figures exemplify a case where the scan by the scanning line GCL at coordinate y1 is not performed due to the abnormality countermeasure processing. This, however, does not necessarily mean that, when the "single area" is the detection target, the scan line GCL overlapping the partial region corresponding to the "single area" is not driven at all. The pixel signal update frequency may simply be reduced, or the pixel signal update may be performed by normal writing as exemplified in FIGS. 21 and 22.

Figure 24:
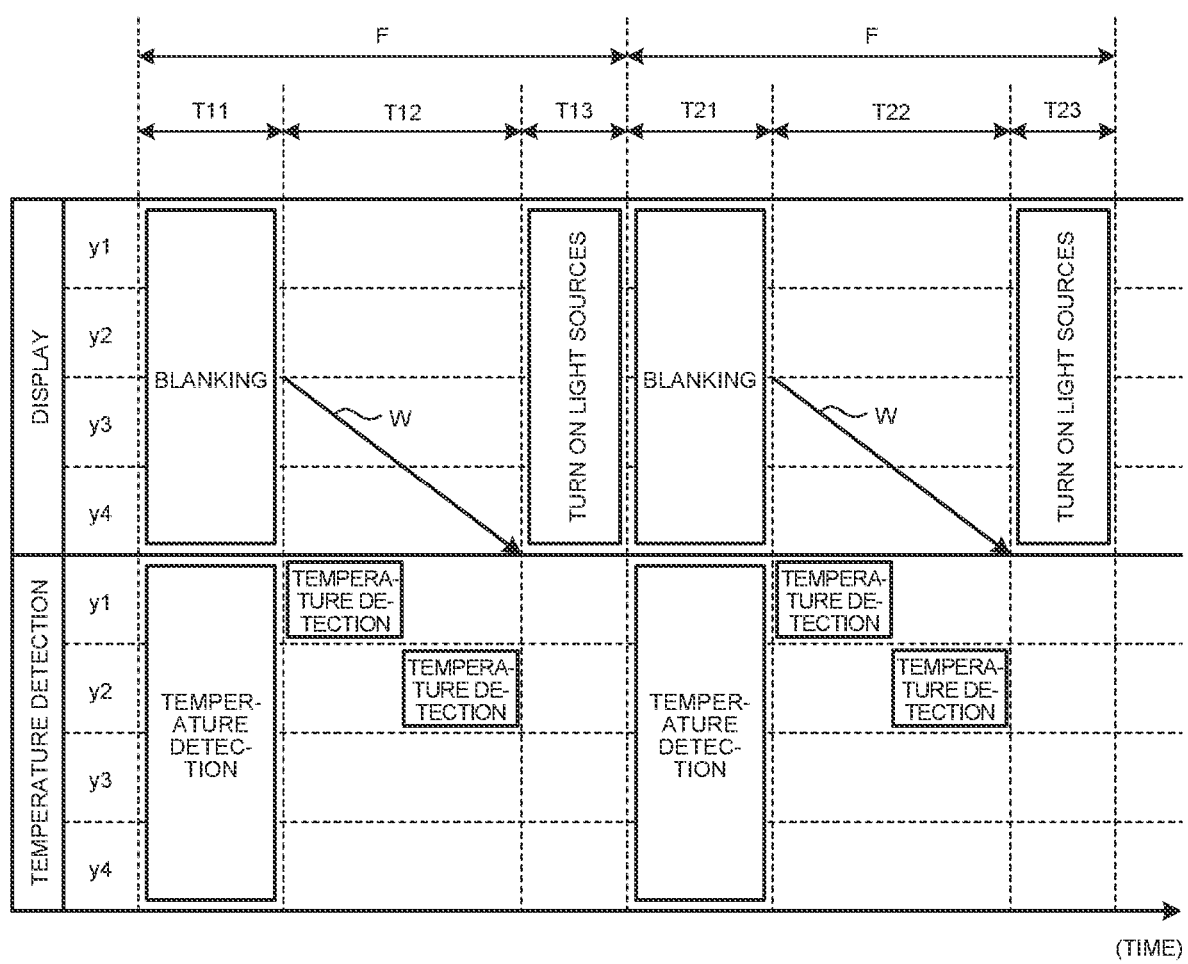
FIG. 24 is a time chart illustrating yet another exemplary relation between the blanking period, the write period, and the lighting period that are included in the frame period, and the temperature detection timing.

FIG. 24 is a time chart illustrating still yet another exemplary relation between the blanking period, the write period, and the lighting period that are included in the frame period, and the temperature detection timing. As illustrated in FIG. 24, the temperature detection targeting the "single area" may be performed separately on two or more areas. For example, the temperature detection pattern illustrated in FIG. 24 is applied when a partial region with the abnormal temperature is present at each of coordinates y1 and y2. FIG. 24 exemplifies a case where the temperature detection is performed on the "multiple areas" (or "all areas") in periods T11 and T21 of every frame, and the temperature detection is performed on the partial regions with coordinates y1 and y2 sequentially in periods T12 and T22.

Figure 25:
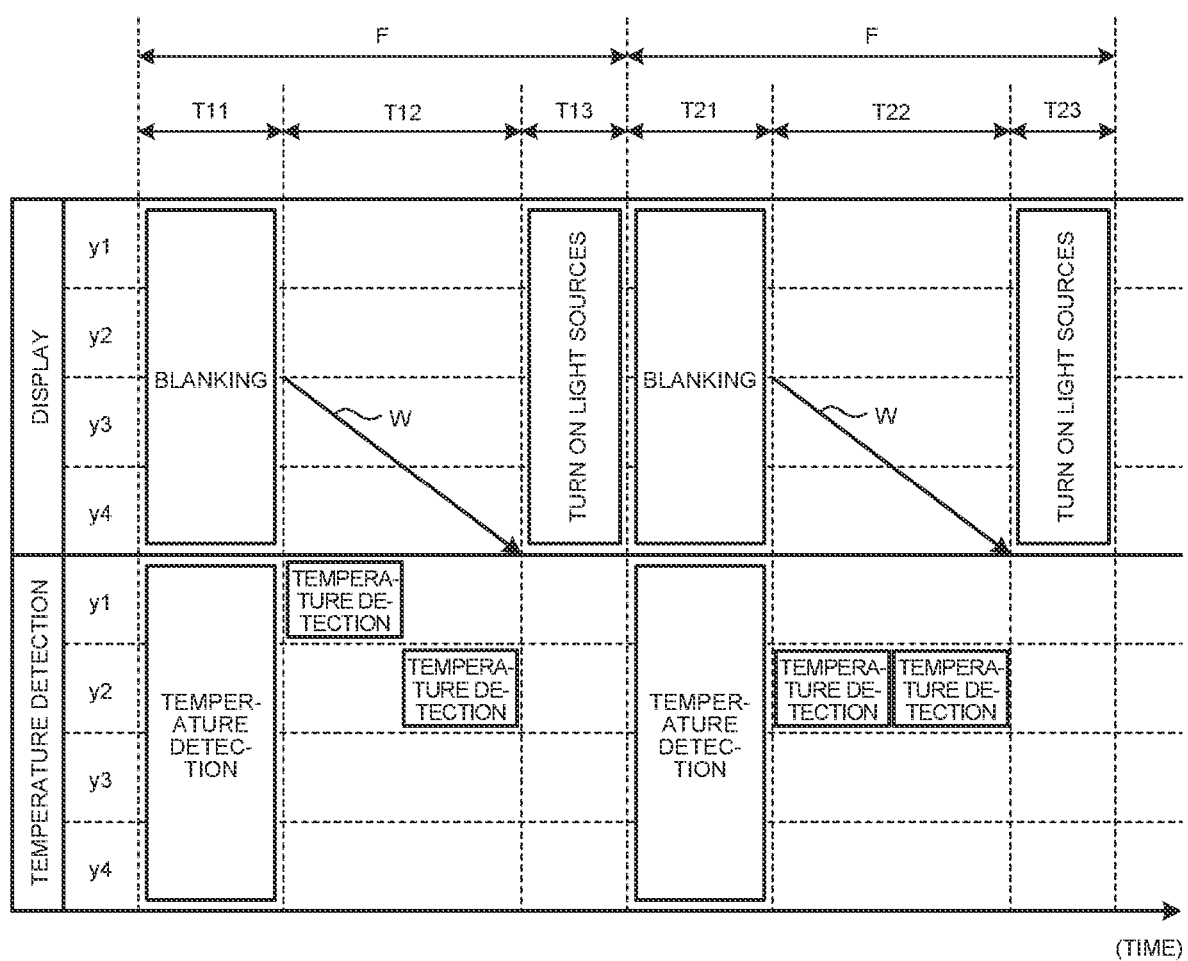
FIG. 25 is a time chart illustrating a further exemplary relation between the blanking period, the write period, and the lighting period that are included in the frame period, and the temperature detection timing.

FIG. 25 is a time chart illustrating a further exemplary relation between the blanking period, the write period, and the lighting period that are included in the frame period, and the temperature detection timing. When the temperature detection targeting the "single area" is performed on two or more areas separately, the temperature detection frequency of each area may not be the same. For example, as illustrated in FIG. 25, the temperature detection may be performed on the partial regions with coordinates y1 and y2 sequentially during period T12, and the temperature detection may be performed on the partial region with coordinate y2 during period T22. This allows the temperature detection frequency of the partial region with coordinate y2 to be higher than that of the partial region with coordinate y1, while the temperature detection targeting the "single area" is applied to the partial region with coordinate y1 and the partial region with coordinate y2.

The time length of each of periods T11, T21, T12, T22, T13, and T23 is set appropriately within a range consistent with the time length of frame period F. The information about such a setting may be included in the setting information or may be set in a circuit other than the register in advance.

The setting information may also include information that causes the temperature detection frequency to be lower than that in normal operation when no abnormal temperature is detected from any partial region continuously for more than a predetermined period of time. For example, when the temperature detection targeting the "all areas" is performed at a frequency of 10 times per second during the normal operation, and no abnormal temperature is detected continuously for 15 minutes or more, the temperature detection targeting the "all areas" may be performed at a frequency of less than 10 times per second (e.g., 1 time).

The setting information may include information that causes the temperature detection frequency in the "all areas" to be higher than that in the normal operation when the abnormal temperature is detected from all of the partial regions. For example, when the temperature detection targeting the "all areas" is performed at a frequency of once per second during the normal operation, and the abnormal temperature is detected, the temperature detection targeting the "all areas" may be performed at a frequency of two or more times per second (e.g., 10 times, 30 times, and the like).

The setting information may include the relation between the frame rate of the display panel 2 and the temperature detection frequency. For example, the setting information may be employed that causes the temperature detection frequency in the normal operation (i.e., the normal temperature detection frequency) to be once per second when images are displayed and output at a high frame rate, the normal temperature detection frequency to be 10 times per second when images are displayed and output at a standard frame rate, and the normal temperature detection frequency to be 30 times per second when images are displayed and output at a slow frame rate. The high frame rate is 120 [Hz], for example. The standard frame rate is 60 [Hz], for example. The slow frame rate is 10 [Hz], for example. These exemplified values are only examples and are not limited to these values. The values can be modified as appropriate to the extent that the large-small relations of numerical values are similar to the relations described above.

The various types of numerical value information about the display control and the light source control in the aforementioned abnormality countermeasure processing may be included in the setting information or may be set in a circuit other than the register in advance.

As explained above, according to the embodiment, the HUD device 1 includes: the display panel 2 having the display region AA in which the pixels VPix are provided; the temperature sensors (e.g., the first temperature detection wirings SMX and the second temperature detection wirings SMY); and the control IC (the DDIC 19) that controls the operation of the display panel 2 and the temperature detector 30. The temperature detection regions SM, in which the temperature sensors are arranged, are provided to overlap the display region AA. The display region AA has a plurality of partial regions that overlap the temperature detection regions SM, respectively. The control IC is provided capable of controlling the display region AA on a partial region basis.

Here, the expression "being capable of controlling the display region AA on a partial region basis" indicates that at least one of the luminance of the partial region and the display output of the partial region can be controlled. Thus, when a temperature rise is detected by the temperature detector 30, it is possible to apply the control corresponding to the temperature rise to the display region AA on a partial region basis. That is, the HUD device 1 can cope with the temperature rise.

According to the embodiment, the signal lines SGL, the scan lines GCL, the first temperature detection wirings SMX, and the second temperature detection wirings SMY of the display panel are coupled to the control IC (the DDIC 19). This eliminates the need for wiring lines for signal transmission for coordination between the functions related to display (e.g., the display controller 111 and the light source controller 112) and the functions related to temperature detection (the temperature detection controller 120), and also eliminates circuits for such coordination. The display device, thus, can be achieved that can reduce an increase in wiring lines and other circuits.

The control IC (the DDIC 19) includes the display controller 111 that controls the operation of the display panel 2, the temperature detection controller 120 that performs the processing related to the operation of the temperature detector 30, and the light source controller 112 that controls the operation of the light source device 6 that illuminates the display panel 2. This allows the control IC to perform the operation controls on the display panel 2, the temperature detector 30, and the light source device 6. This eliminates the need for the circuits related to the coordination of these operation controls and the wiring lines for coupling the circuits each other.

The control IC (the DDIC 19) performs the predetermined abnormality countermeasure processing when a temperature equal to or higher than the first temperature T2 is detected in one or more of the temperature detection regions SM. The abnormality countermeasure processing includes one or more of the first processing, the second processing, and the third processing. The first processing causes the display update frequency of the display panel 2 to be lower than that before the temperature equal to or higher than the first temperature T2 is detected. The second processing causes the operating frequency of at least a part of the functions included in the control IC (e.g., the operating frequency of the display controller 111 that is linked with the frame rate of the display panel 2) to be lower than that before the temperature equal to or higher than the first temperature is detected. The third processing causes the luminance of light illuminating the display panel 2 to be lower than that before the temperature equal to or higher than the first temperature is detected. The first and the second processing reduce the load on the control IC and heat generated from the control IC. The third processing can reduce heat generated from the light source device 6.

The first temperature T2 is equal to or higher than 50 degrees Celsius. This allows abnormalities to be coped with the abnormality countermeasure processing even when the partial region reaches a temperature equal to or higher than 50 degrees Celsius, where the probability of the display panel 2 failing to operate properly cannot be reduced to zero.

When a temperature equal to or higher than the second temperature T3, which is higher than the first temperature T2, is detected in one or more of the temperature detection regions SM, the abnormality countermeasure processing includes one or more of the fourth processing, the fifth processing, and the sixth processing. The fourth processing causes the display update frequency of the display panel 2 to be lower than that in the first processing (e.g., the fourth processing stops display output). The fifth processing causes the operating frequency of at least a part of the functions in the control IC (the DDIC 19) to be lower than that in the second processing (e.g., the fifth processing stops the operation of the display controller 111 due to the stop of the display output). The sixth processing causes the luminance of light illuminating the display panel 2 to be lower than that in the third processing (e.g., the sixth processing does not turn on light). The fourth and the fifth processing reduce the load on the control IC and heat generated from the control IC. The sixth processing can reduce heat generated from the light source device 6.

The third processing and the sixth processing are performed on each of the partial regions overlapping the temperature detection regions SM in each of which the temperature of the first temperature T2 is detected. This allows both reduction of heat generation in the partial regions overlapping the temperature detection regions SM in each of which the temperature of the first temperature T2 is detected, and normal display output in other partial regions.

The first processing and the fourth processing are performed on each of the partial regions that share the scan line provided in the partial region that overlaps the temperature detection region in which the temperature equal to or higher than the first temperature is detected. This allows both reduction of heat generation by omitting a part or all of the operations related to the partial region in which the abnormal temperature is detected and perfect operation is not ensured, and the normal display output in other partial regions.

The temperature detection controller 120 performs control such that the temperature detection frequency per unit time when the abnormality countermeasure processing is being performed is higher than that when no abnormality countermeasure processing is being performed. With this, the abnormality countermeasure processing or canceling the abnormality countermeasure processing can be performed more quickly corresponding to the temperature change after the detection of the abnormal temperature.

When a temperature equal to or higher than the first temperature T2 is detected in one of the temperature detection regions SM, the temperature detection controller 120 performs the temperature detection on the one temperature detection region SM during the blanking period in which no images are displayed by the display panel 2 and the write period in which the pixel signals are written to the pixels. For example, the temperature detection controller 120 performs the temperature detection on the one temperature detection region SM at least one time and no more than 120 times per second. This makes it easier to increase the temperature detection frequency in the temperature detection region SM.

When a temperature equal or higher than the first temperature T2 is detected in two or more of the temperature detection regions SM, the temperature detection controller 120 performs the temperature detection on the two or more temperature detection regions SM during the blanking period in which no images are displayed by the display panel. For example, the temperature detection controller 120 performs the temperature detection on the two or more temperature detection regions SM at least one time and no more than 60 times per second. This allows performing the temperature detection in a period different from the period in which the operation control related to the display output is performed, such as the write period and the lighting period. The temperature detection and the display output can be performed in separate periods.

Other action effects provided by the mode described in the embodiment that are obvious from the present disclosure or at which those skilled in the art can appropriately arrive should be interpreted to be provided by the present invention.

Although the preferred embodiment has been explained above, the present disclosure is not limited to the embodiment. The contents disclosed in the embodiment are merely examples, and various modifications are possible in a range without departing from the gist of the present disclosure. It is needless to say that appropriate modifications made in the range without departing from the gist of the present disclosure also belong to the technical scope of the present disclosure.

The liquid crystal panel is exemplified as the display panel 2, but the display panel 2 may be an organic electroluminescence (EL) panel, for example. The display panel 2 may be a micro light-emitting diode (LED) panel that displays an image by emitting different light from each LED serving as a light emitting element. The light emitting element LED has a size of approximately 3 μm to 100 μm in plan view. When the display panel 2 is the organic EL panel or the micro-LED panel, the light source device 6 is omitted. When the display panel 2 is the organic EL panel, the light source controller 112 controls the light emission luminance of the organic EL panel in the entire display region AA or the light emission luminance for each of the partial regions. When the display panel 2 is the micro-LED panel, the light source controller 112 controls the light emission luminance of the micro-LEDs in the entire display region AA or the light emission luminance for each of the partial regions.

The configuration of the temperature detector 30 is not limited to that of what is called an in-cell type, in which the temperature detector 30 is provided integrally with the display panel 2 as described in the embodiment. The configuration of the temperature detector 30 may be of what is called an out-cell type in which the display panel 2 and a temperature sensor panel are separately provided. In the configuration of the out-cell type, the display panel 2 is dedicated for display, does not include the first temperature detection wirings SMX and the second temperature detection wirings SMY, and is provided separately from the temperature sensor panel in which the first temperature detection wirings SMX and the second temperature detection wirings SMY serving as the temperature detector 30 are stacked. In the configuration of the out-cell type, the temperature sensor panel is provided on the projection side of the display panel 2 dedicated for display.

The criterion of "equal to or higher than a certain temperature (e.g., the first temperature T2) and lower than another temperature (e.g., the second temperature T3)" may be that of "higher than a certain temperature and equal to or lower than another temperature". The details of the relation between a temperature and the threshold values such as the first temperature T2 can be modified as appropriate. Likewise, "equal to higher than" may be used for "higher than". Likewise, "equal to or lower than" may be used for "lower than". In other words, "equal to or higher than", "higher than", "lower than", and "equal to or lower than" may be modified as appropriate to the extent that there is no inconsistency in the determination.

The arrangement of the temperature detection regions SM is not limited to a matrix with a row-column configuration. For example, only either the first temperature detection wirings SMX or the second temperature detection wirings SMY may be provided, and the provided temperature detection wirings may function as the temperature detection regions SM along one of the first direction Dx or the second direction Dy. In such a case, a plurality of partial regions are set in the display region AA so that they individually overlap the temperature detection regions SM along such one direction.

Either the signal lines SGL or the scan lines GCL need not be coupled to the DDIC 19.

When the signal lines SGL are not coupled to the DDIC 19, the scan lines GCL are coupled to the display controller 111 of the DDIC 19. The display controller 111 performs a function related to scan when the drive signal is applied to the scan line GCL to write the pixel signals. The signal lines SGL are coupled to a source driver that is provided separately from the DDIC 19. The source driver performs a function related to input of the pixel signals to corresponding sub-pixels SPix in the writing.

When the scan lines GCL are not coupled to the DDIC 19, the signal lines SGL are coupled to the display controller 111 of the DDIC 19. The display controller 111 performs a function related to the input of the pixel signals to corresponding sub-pixels SPix in the writing. The scan lines GCL are coupled to a gate driver that is provided separately from the DDIC 19. The gate driver performs a function related to scan when the drive signal is applied to the scan line GCL to write the pixel signals.

The examples of reducing the operating frequency of the display controller 111 are described above as examples of the second processing and the fifth processing. The second processing and the fifth processing are not limited to those examples. For example, the second processing and the fifth processing may uniformly reduce all of the operating frequencies of the components (e.g., the display controller 111, the light source controller 112, and the temperature detection controller 120) corresponding to the various functions in the DDIC 19 in conjunction with the processing to reduce the frame rate of the display panel 2, or the operating frequencies of the components corresponding to functions excluding some functions may be reduced uniformly.

What is claimed is:

1. A display device, comprising:
   a display panel having a display region in which a plurality of pixels are provided;
   a plurality of temperature sensors; and
   a control integrated circuit (IC) configured to control operations of the display panel and the temperature sensors,
   wherein
   a plurality of temperature detection regions in which the temperature sensors are arranged are provided to overlap the display region,
   the display region has a plurality of partial regions that overlap the temperature detection regions, respectively,
   the control IC is provided capable of controlling the display region on a partial region basis,
   at least either signal lines of the display panel or scan lines of the display panel, and the temperature sensors are coupled to the control IC,
   the control IC includes:
      a display controller configured to control the operation of the display panel;
      a temperature detection controller configured to perform processing related to the operation of the temperature sensors; and
      a light source controller configured to control the operation of a light source device that illuminates the display panel, and
   when a temperature equal to or higher than a first temperature is detected in one of the temperature detection regions, the temperature detection controller performs temperature detection on the one temperature detection region in a blanking period in which no images are displayed by the display panel and in a write period in which pixel signals are written to the pixels.

2. The display device according to claim 1, wherein
   the control IC performs predetermined abnormality countermeasure processing when a temperature equal to or higher than the first temperature is detected in one or more of the temperature detection regions,
   the abnormality countermeasure processing includes one or more of first processing, second processing, and third processing,
   the first processing causes a display update frequency of the display panel to be lower than the display update frequency before the temperature equal to or higher than the first temperature is detected, the second processing causes an operating frequency of at least a part of functions included in the control IC to be lower than the operating frequency before the temperature equal to or higher than the first temperature is detected, and the third processing causes a luminance of light illuminating the display panel to be lower than the luminance before the temperature equal to or higher than the first temperature is detected.

3. The display device according to claim 2, wherein the first temperature is equal to or higher than 50 degrees Celsius.

4. The display device according to claim 2, wherein the abnormality countermeasure processing includes one or more of fourth processing, fifth processing, and sixth processing when a temperature equal to or higher than a second temperature that is higher than the first temperature is detected in one or more of the temperature detection regions, the fourth processing causes the display update frequency of the display panel to be lower than the display update frequency in the first processing, the fifth processing causes the operating frequency of at least a part of functions included in the control IC to be lower than the operating frequency in the second processing, and the sixth processing causes the luminance of the light illuminating the display panel to be lower than the luminance in the third processing.

5. The display device according to claim 4, wherein the first processing and the fourth processing are performed on each of the partial regions that share a scan line provided in the partial region that overlaps the temperature detection region in which the temperature equal to or higher than the first temperature is detected.

6. The display device according to claim 1, wherein the temperature detection controller performs the temperature detection on the temperature detection at least one time and no more than 120 times per second.

7. The display device according to claim 1, wherein, when a temperature equal to or higher than the first temperature is detected in two or more of the temperature detection regions, the temperature detection controller performs temperature detection on the two or more of the temperature detection regions in the blanking period in which no images are displayed by the display panel.

8. The display device according to claim 7, wherein the temperature detection controller performs the temperature detection on the two or more of the temperature detection regions at least one time and no more than 60 times per second.

9. A display device, comprising:
a display panel having a display region in which a plurality of pixels are provided;
a plurality of temperature sensors; and
a control integrated circuit (IC) configured to control operations of the display panel and the temperature sensors,
wherein
a plurality of temperature detection regions in which the temperature sensors are arranged are provided to overlap the display region,
the display region has a plurality of partial regions that overlap the temperature detection regions, respectively, the control IC is provided capable of controlling the display region on a partial region basis, at least either signal lines of the display panel or scan lines of the display panel, and the temperature sensors are coupled to the control IC, the control IC includes:
a display controller configured to control the operation of the display panel;
a temperature detection controller configured to perform processing related to the operation of the temperature sensors; and
a light source controller configured to control the operation of a light source device that illuminates the display panel, the control IC performs predetermined abnormality countermeasure processing when a temperature equal to or higher than a first temperature is detected in one or more of the temperature detection regions, the abnormality countermeasure processing includes one or more of first processing, second processing, and third processing, the first processing causes a display update frequency of the display panel to be lower than the display update frequency before the temperature equal to or higher than the first temperature is detected, the second processing causes an operating frequency of at least a part of functions included in the control IC to be lower than the operating frequency before the temperature equal to or higher than the first temperature is detected, the third processing causes a luminance of light illuminating the display panel to be lower than the luminance before the temperature equal to or higher than the first temperature is detected, the abnormality countermeasure processing includes one or more of fourth processing, fifth processing, and sixth processing when a temperature equal to or higher than a second temperature that is higher than the first temperature is detected in one or more of the temperature detection regions, the fourth processing causes the display update frequency of the display panel to be lower than the display update frequency in the first processing, the fifth processing causes the operating frequency of at least a part of functions included in the control IC to be lower than the operating frequency in the second processing, the sixth processing causes the luminance of the light illuminating the display panel to be lower than the luminance in the third processing, and the third processing and the sixth processing are performed on each of the partial regions overlapping the temperature detection regions in each of which the temperature equal to or higher than the first temperature is detected.

10. A display device, comprising:
a display panel having a display region in which a plurality of pixels are provided;
a plurality of temperature sensors; and
a control integrated circuit (IC) configured to control operations of the display panel and the temperature sensors,
wherein
a plurality of temperature detection regions in which the temperature sensors are arranged are provided to overlap the display region, the display region has a plurality of partial regions that overlap the temperature detection regions, respectively, the control IC is provided capable of controlling the display region on a partial region basis, at least either signal lines of the display panel or scan lines of the display panel, and the temperature sensors are coupled to the control IC, the control IC includes:
- a display controller configured to control the operation of the display panel;
- a temperature detection controller configured to perform processing related to the operation of the temperature sensors; and
- a light source controller configured to control the operation of a light source device that illuminates the display panel, the control IC performs predetermined abnormality countermeasure processing when a temperature equal to or higher than a first temperature is detected in one or more of the temperature detection regions, the abnormality countermeasure processing includes one or more of first processing, second processing, and third processing, the first processing causes a display update frequency of the display panel to be lower than the display update frequency before the temperature equal to or higher than the first temperature is detected, the second processing causes an operating frequency of at least a part of functions included in the control IC to be lower than the operating frequency before the temperature equal to or higher than the first temperature is detected, the third processing causes a luminance of light illuminating the display panel to be lower than the luminance before the temperature equal to or higher than the first temperature is detected, and the temperature detection controller performs control such that a temperature detection frequency per unit time when the abnormality countermeasure processing is performed is higher than the temperature detection frequency per unit time when no abnormality countermeasure processing is performed.

* * * * *